United States Patent
Harrebek et al.

(10) Patent No.: US 12,126,420 B2
(45) Date of Patent: Oct. 22, 2024

(54) BEAM ALIGNMENT VERIFICATION FOR WIRELESS NETWORKS

(71) Applicant: Nokia Technologies Oy, Espoo (FI)

(72) Inventors: Johannes Harrebek, Aalborg (DK); Simon Svendsen, Aalborg (DK); Benny Vejlgaard, Gistrup (DK); Claudio Rosa, Randers NV (DK); Mark Cudak, Rolling Meadows, IL (US); Frederick Vook, Schaumburg, IL (US); Nitin Mangalvedhe, Hoffman Estates, IL (US); Jun Tan, Glenview, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 271 days.

(21) Appl. No.: 17/642,148

(22) PCT Filed: Sep. 26, 2020

(86) PCT No.: PCT/IB2020/059024
§ 371 (c)(1),
(2) Date: Mar. 10, 2022

(87) PCT Pub. No.: WO2021/053650
PCT Pub. Date: Mar. 25, 2021

(65) Prior Publication Data
US 2022/0376768 A1 Nov. 24, 2022

Related U.S. Application Data

(60) Provisional application No. 62/903,372, filed on Sep. 20, 2019.

(51) Int. Cl.
*H04B 7/08* (2006.01)
*H04B 17/318* (2015.01)

(52) U.S. Cl.
CPC .......... *H04B 7/088* (2013.01); *H04B 17/318* (2015.01)

(58) Field of Classification Search
CPC .............................. H04B 7/088; H04B 17/318
USPC ........................................................ 375/267
See application file for complete search history.

(56) References Cited

U.S. PATENT DOCUMENTS

| 2014/0098912 A1* | 4/2014 | Yin | ........................ H04L 25/067 |
| | | | 375/345 |
| 2019/0007906 A1* | 1/2019 | Hessler | ................. H04L 5/0048 |
| 2019/0052344 A1 | 2/2019 | Kundargi et al. | |

OTHER PUBLICATIONS

"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-144.

(Continued)

*Primary Examiner* — Kevin M Burd
(74) *Attorney, Agent, or Firm* — Lippes Mathias LLP

(57) ABSTRACT

A method may include determining, by a user equipment, a beam alignment reference value and a beam alignment test value; and determining, by the user equipment, based on the beam alignment reference value and the beam alignment test value, that a user equipment receive beam used by the user equipment is not aligned with a transmit beam of the base station.

13 Claims, 9 Drawing Sheets

(56) References Cited

OTHER PUBLICATIONS

"3rd Generation Partnership Project; Technical Specification Group Radio Access Network; NR; Physical layer procedures for data (Release 15)", 3GPP TS 38.214, V15.6.0, Jun. 2019, pp. 1-105.
International Search Report and Written Opinion received for corresponding Patent Cooperation Treaty Application No. PCT/IB2020/059024, dated Dec. 21, 2020, 15 pages.
"DL Beam Management", 3GPP TSG RAN WG1 Meeting #88b, R1-1704229, Agenda : 8.1.2.2.1, Huawei, Apr. 3-7, 2017, 10 pages.
"Beam Recovery in NR", 3GPP TSG-RAN WG2 NR Adhoc, R2-1700075, Agenda : 3.3.1.1.4, Nokia, Jan. 17-19, 2017, 4 pages.

* cited by examiner

Determining, by a user equipment, a beam alignment reference value based on a first receive power of a signal received by the user equipment from a base station via a first user equipment receive beam, based on a first user equipment beam configuration, that is aligned with a transmit beam of the base station, and a second receive power of a signal received by the user equipment from the base station via a second user equipment receive beam, based on a second user equipment beam configuration, that is aligned with the transmit beam of the base station, wherein the first user equipment receive beam and the second user equipment receive beam have different beam widths — 710

Determining, by the user equipment, a beam alignment test value based on a third receive power of a signal received by the user equipment from the base station via a third user equipment receive beam, based on the first user equipment beam configuration, and a fourth receive power of a signal received by the user equipment from the base station via a fourth user equipment receive beam, based on the second user equipment beam configuration — 720

Determining, by the user equipment, based on the beam alignment reference value and the beam alignment test value, that the third user equipment receive beam used by the user equipment is not aligned with the transmit beam of the base station — 730

FIG. 7

BEAM ALIGNMENT VERIFICATION FOR WIRELESS NETWORKS

RELATED APPLICATION

This application claims priority to PCT Application No. PCT/IB2020/059024, filed on Sep. 26, 2020 which claims priority to U.S. Application No. 62/903,372, filed on Sep. 20, 2019, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include determining, by a user equipment, a beam alignment reference value based on a first receive power of a signal received by the user equipment from a base station via a first user equipment receive beam, based on a first user equipment beam configuration, that is aligned with a transmit beam of the base station, and a second receive power of a signal received by the user equipment from the base station via a second user equipment receive beam, based on a second user equipment beam configuration, that is aligned with the transmit beam of the base station, wherein the first user equipment receive beam and the second user equipment receive beam have different beam widths; determining, by the user equipment, a beam alignment test value based on a third receive power of a signal received by the user equipment from the base station via a third user equipment receive beam, based on the first user equipment beam configuration, and a fourth receive power of a signal received by the user equipment from the base station via a fourth user equipment receive beam, based on the second user equipment beam configuration; and determining, by the user equipment, based on the beam alignment reference value and the beam alignment test value, that the third user equipment receive beam used by the user equipment is not aligned with the transmit beam of the base station.

According to an example embodiment, an apparatus may include means for determining, by a user equipment, a beam alignment reference value based on a first receive power of a signal received by the user equipment from a base station via a first user equipment receive beam, based on a first user equipment beam configuration, that is aligned with a transmit beam of the base station, and a second receive power of a signal received by the user equipment from the base station via a second user equipment receive beam, based on a second user equipment beam configuration, that is aligned with the transmit beam of the base station, wherein the first user equipment receive beam and the second user equipment receive beam have different beam widths; means for determining, by the user equipment, a beam alignment test value based on a third receive power of a signal received by the user equipment from the base station via a third user equipment receive beam, based on the first user equipment beam configuration, and a fourth receive power of a signal received by the user equipment from the base station via a fourth user equipment receive beam, based on the second user equipment beam configuration; and means for determining, by the user equipment, based on the beam alignment reference value and the beam alignment test value, that the third user equipment receive beam used by the user equipment is not aligned with the transmit beam of the base station.

According to an example embodiment, an apparatus may include: at least one processor; and at least one memory including computer program code; the at least one memory and the computer program code configured to, with the at least one processor, cause the apparatus at least to determine, by a user equipment, a beam alignment reference value based on a first receive power of a signal received by the user equipment from a base station via a first user equipment receive beam, based on a first user equipment beam configuration, that is aligned with a transmit beam of the base station, and a second receive power of a signal received by the user equipment from the base station via a second user equipment receive beam, based on a second user equipment beam configuration, that is aligned with the transmit beam of the base station, wherein the first user equipment receive beam and the second user equipment receive beam have different beam widths; determine, by the user equipment, a beam alignment test value based on a third receive power of a signal received by the user equipment from the base station via a third user equipment receive beam, based on the first user equipment beam configuration, and a fourth receive power of a signal received by the user equipment from the base station via a fourth user equipment receive beam, based on the second user equipment beam configuration; and determine, by the user equipment, based on the beam alignment reference value and the beam alignment test value, that the third user equipment receive beam used by the user equipment is not aligned with the transmit beam of the base station.

According to an example embodiment, a non-transitory computer-readable storage medium comprising instructions stored thereon that, when executed by at least one processor, are configured to cause a computing system to perform a method of: determining, by a user equipment, a beam alignment reference value based on a first receive power of a signal received by the user equipment from a base station via a first user equipment receive beam, based on a first user equipment beam configuration, that is aligned with a transmit beam of the base station, and a second receive power of a signal received by the user equipment from the base station via a second user equipment receive beam, based on a second user equipment beam configuration, that is aligned with the transmit beam of the base station, wherein the first user equipment receive beam and the second user equipment receive beam have different beam widths; determining, by the user equipment, a beam alignment test value based on a third receive power of a signal received by the user equipment from the base station via a third user equipment receive beam, based on the first user equipment beam configuration, and a fourth receive power of a signal received by the user equipment from the base station via a fourth user equipment receive beam, based on the second user equipment beam configuration; and determining, by the user equipment, based on the beam alignment reference value and the beam alignment test value, that the third user equipment receive beam used by the user equipment is not aligned with the transmit beam of the base station.

According to an example embodiment, a method may include receiving, by a base station from a user equipment, a beam alignment reference value that is based on a first receive power of a signal from the base station to the user equipment via a first user equipment receive beam that is aligned with a transmit beam of the base station, and a second receive power of a signal from the base station to the user equipment via a second user equipment receive beam that is aligned with the transmit beam of the base station; sending, by the base station to the user equipment, a request for a beam alignment measurement; sending, by the base station to the user equipment, at least one downlink reference signal; receiving, by the base station from the user equipment in response to the request for a beam alignment measurement, a message that includes at least one of: a beam alignment test value based on a third receive power of a signal from the base station to the user equipment via a third user equipment receive beam, and a fourth receive power of a signal from the base station to the user equipment via a fourth user equipment receive beam; or a beam alignment result that indicates that the third user equipment receive beam is not aligned with the transmit beam of the base station.

According to an example embodiment, an apparatus may include means for receiving, by a base station from a user equipment, a beam alignment reference value that is based on a first receive power of a signal from the base station to the user equipment via a first user equipment receive beam that is aligned with a transmit beam of the base station, and a second receive power of a signal from the base station to the user equipment via a second user equipment receive beam that is aligned with the transmit beam of the base station; means for sending, by the base station to the user equipment, a request for a beam alignment measurement; means for sending, by the base station to the user equipment, at least one downlink reference signal; means for receiving, by the base station from the user equipment in response to the request for a beam alignment measurement, a message that includes at least one of: a beam alignment test value based on a third receive power of a signal from the base station to the user equipment via a third user equipment receive beam, and a fourth receive power of a signal from the base station to the user equipment via a fourth user equipment receive beam; or a beam alignment result that indicates that the third user equipment receive beam is not aligned with the transmit beam of the base station.

According to an example embodiment, an apparatus may include: at least one processor; and at least one memory including computer program code; the at least one memory and the computer program code configured to, with the at least one processor, cause the apparatus at least to receive, by a base station from a user equipment, a beam alignment reference value that is based on a first receive power of a signal from the base station to the user equipment via a first user equipment receive beam that is aligned with a transmit beam of the base station, and a second receive power of a signal from the base station to the user equipment via a second user equipment receive beam that is aligned with the transmit beam of the base station; send, by the base station to the user equipment, a request for a beam alignment measurement; send, by the base station to the user equipment, at least one downlink reference signal; receive, by the base station from the user equipment in response to the request for a beam alignment measurement, a message that includes at least one of: a beam alignment test value based on a third receive power of a signal from the base station to the user equipment via a third user equipment receive beam, and a fourth receive power of a signal from the base station to the user equipment via a fourth user equipment receive beam; or a beam alignment result that indicates that the third user equipment receive beam is not aligned with the transmit beam of the base station.

According to an example embodiment, a non-transitory computer-readable storage medium comprising instructions stored thereon that, when executed by at least one processor, are configured to cause a computing system to perform a method of: receiving, by a base station from a user equipment, a beam alignment reference value that is based on a first receive power of a signal from the base station to the user equipment via a first user equipment receive beam that is aligned with a transmit beam of the base station, and a second receive power of a signal from the base station to the user equipment via a second user equipment receive beam that is aligned with the transmit beam of the base station; sending, by the base station to the user equipment, a request for a beam alignment measurement; sending, by the base station to the user equipment, at least one downlink reference signal; receiving, by the base station from the user equipment in response to the request for a beam alignment measurement, a message that includes at least one of: a beam alignment test value based on a third receive power of a signal from the base station to the user equipment via a third user equipment receive beam, and a fourth receive power of a signal from the base station to the user equipment via a fourth user equipment receive beam; or a beam alignment result that indicates that the third user equipment receive beam is not aligned with the transmit beam of the base station.

The details of one or more examples of embodiments are set forth in the accompanying drawings and the description below. Other features will be apparent from the description and drawings, and from the claims.

BRIEF DESCRIPTION OF THE DRAWINGS

FIG. 7 is a flow chart illustrating operation of a user equipment according to an example embodiment.

DETAILED DESCRIPTION

Figure 1:
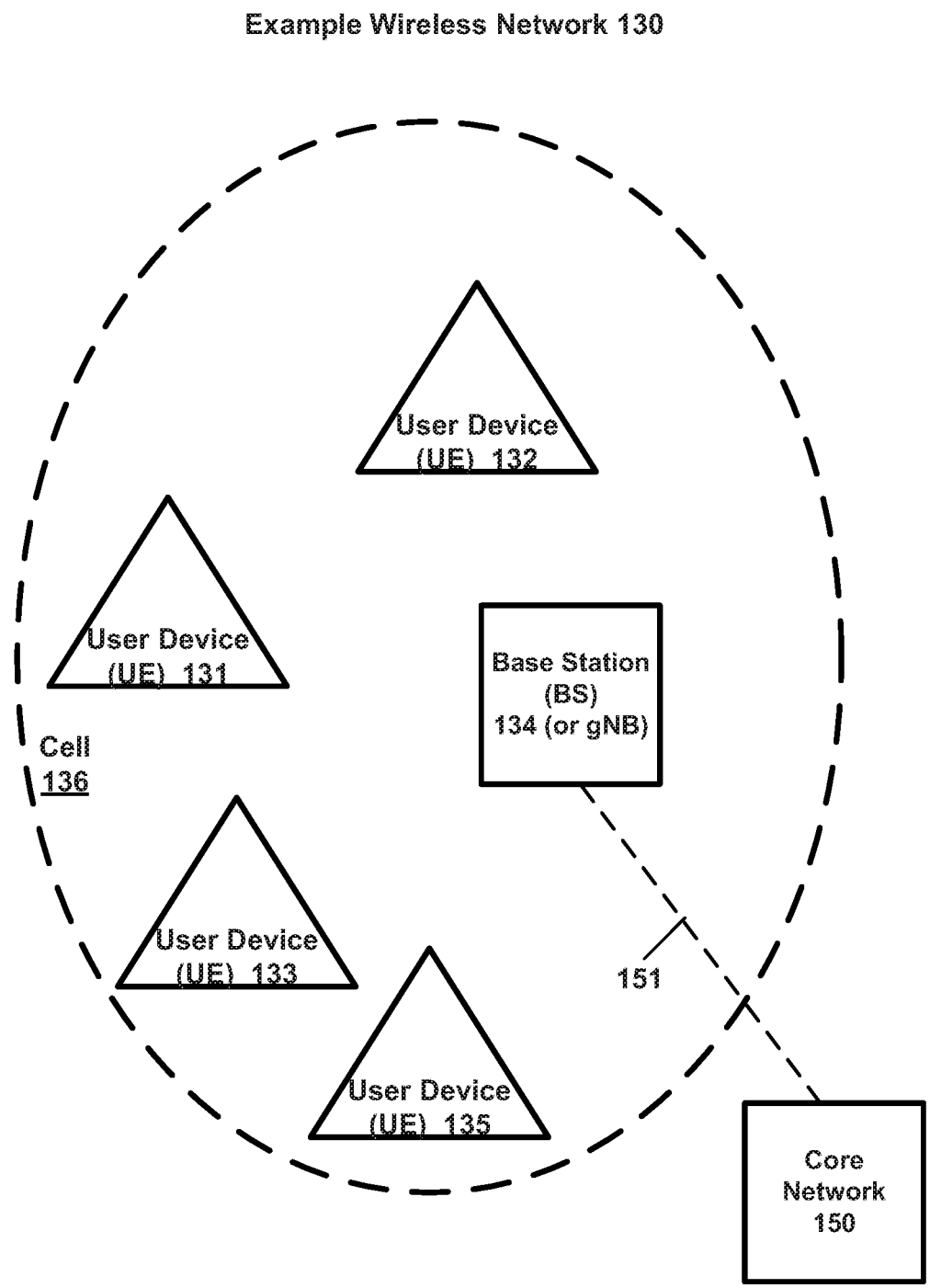
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Figure 2:
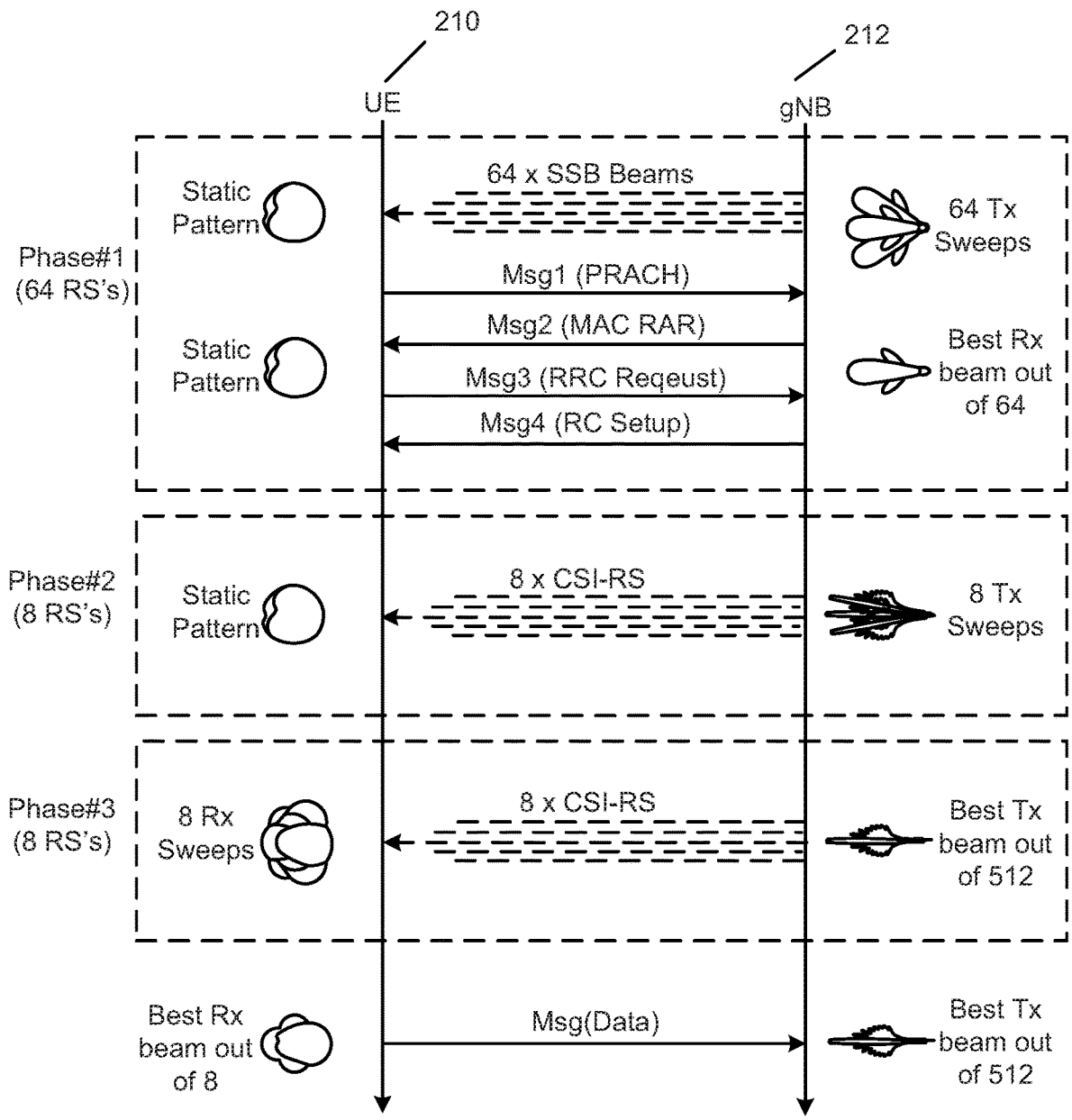
FIG. 2 is a diagram illustrating an example beam alignment procedure.

FIG. 2 is a diagram illustrating an example beam alignment procedure. A UE 210 may be in communication with a gNB 212. Three phases are shown for a beam alignment procedure that allows UE 210 and gNB 212 to select a narrow beam for the UE-gNB communication link.

Phase #1: UE 210 is configured for broad (wide) beam receiving (receiving reference signals via a wide receive beam), while gNB 212 is performing downlink (DL) SSB (synchronization signal block) beam sweeping. UE measures the reference signal received power (RSRP) for all of the (up to) 64 SSB beams. At random access, the UE indicates to gNB 212 the best SSB beam (i.e., the SSB beam having a highest RSRP as measured by UE) by transmitting a random access preamble on physical random access resources that are associated to the corresponding SSB beam, and using same beam configuration as in receiving. Thus, according to an example embodiment, Phase #1: UE is configured for broad beam RX while gNB is performing DL (downlink) SSB beam sweeping. UE measures received power (e.g., RSRP) for all SSB beams received and indicates to gNB the best (or strongest or highest power) SSB beam by transmitting a random access preamble on physical random access resources that are associated to the corresponding SSB beam, and using same beam configuration as in RX. Thus, for example, at Phase #1, the gNB 212 sweeps its beam, and UE 210 uses a wide beam to measure RSRP for each gNB beam, and UE reports back the strongest (or highest power) gNB beam via random access procedure. Thus, in phase #1, the UE receives and measures signals using a static or wide UE receive beam.

Phase #2: UE 210 is configured for broad beam receiving, while gNB is performing refined downlink (DL) channel state information-reference signal (CSI-RS) (or narrow beam) beam sweeping, in which a CSI-RS signal is transmitted for each of the 8 CSI-RS (or narrow) beams of the gNB. UE measures RSRP (or other metric, e.g., SINR) for all CSI-RS beams received and reports the best CSI-RS (e.g., the CSI-RS in correspondence of which the UE measures the highest RSRP or SINR) back to gNB 212 using same beam configuration as in receiving. Thus, at phase #2, gNB 212 sweeps through a set of CSI-RS narrow beams, and UE 210 reports back to gNB 212 the best or strongest CSI-RS/narrow beam.

Phase #3: gNB 212 continues transmitting CSI-RS using its best (or highest power) narrow transmit beam found in Phase #2, and UE 210 sweeps through its narrow receive beams or refined receive beams so the UE 210 may determine its best UE narrow receive beam that is aligned with the gNB narrow transmit beam. The UE may perform this by selecting the UE narrow receive beam where the UE measures the highest RSRP/SINR on CSI-RS. At the end of three phase alignment between gNB 212 and UE 210 illustrated in FIG. 2, the selected (best) gNB narrow transmit beam is pointed towards the UE (e.g., within a threshold of accuracy), and the best or selected (highest power) UE narrow receive beam is pointed (e.g., within a threshold) towards (or aligned with) the gNB narrow transmit beam (or pointed from the UE 210 back towards the gNB 212). Thus, after the beam alignment procedure, it may be assumed, for example, that the (e.g., best or highest RSRP) UE narrow receive beam (for this UE-gNB communications link) is aligned with the (selected or highest power) gNB narrow transmit beam for the UE-gNB communications link. Thus, at the end of the three phase beam alignment illustrated in FIG. 2, an alignment (e.g., within a threshold amount) may be obtained between the gNB narrow transmit beam and the UE narrow receive beam, and this pair of beams may provide, e.g., for maximized directional gain for communications between the UE 210 and gNB 212, and may provide for a reduced (e.g., minimized) interference on other users or UEs in serving cell and neighbor cells.

The example beam alignment procedure as depicted in FIG. 2 may be used to align the UE narrow receive beam with the gNB narrow transmit beam. However, one or more conditions or situations may arise that may cause UE beam misalignment, e.g., where the UE narrow receive beam is no longer aligned with (or points towards) the gNB narrow transmit beam for the UE-gNB communications link. For example, to maintain beam alignment, this may require uplink/downlink (UL/DL) beam correspondence, and that the UE beam direction is correct (pointed towards the gNB narrow transmit beam).

Figure 3:
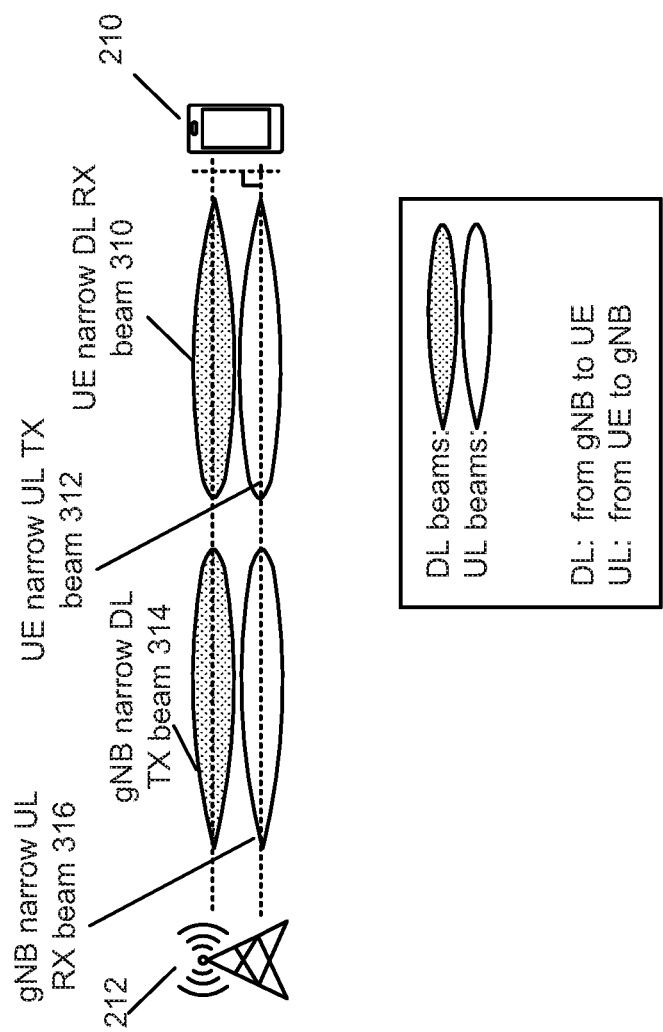
FIG. 3 is a diagram illustrating beams according to an example embodiment.

FIG. 3 is a diagram illustrating beams according to an example embodiment. As shown in FIG. 3, four beams are shown, including a UE narrow downlink (DL) receive (RX) beam 310, a UE narrow uplink (UL) transmit (TX) beam 312, a gNB narrow DL transmit beam 314, and a gNB narrow UL receive beam 316. As shown in FIG. 3, the UE narrow DL receive beam 310 points towards gNB 212 or towards gNB narrow DL transmit beam 314, and the UE narrow UL transmit beam 312 points towards gNB 212 or towards gNB narrow UL receive beam 316. Thus, in FIG. 3, both of the UE narrow UL transmit beam 312 and UE narrow DL receive beam 310 are aligned with gNB 212 (or aligned with beams of gNB 212). While FIG. 3 shows narrow beams at the UE and gNB, the UE or gNB may use any size or shape beams (with any beam width) for communication.

Also, according to an example embodiment, in some cases, uplink/downlink (UL/DL) beam correspondence may exist, or may be assumed at gNB and at UE, e.g., the optimum or best UL transmit beam (or beam configuration or beam setting) may, at least in some cases, be derived from the DL receive beam configuration (e.g., the UL narrow transmit beam configuration at UE may be same as DL narrow receive beam configuration at UE, or some known offset from the DL narrow receive beam configuration of the UE).

However, in some cases, a UE beam that was previously aligned with a gNB (or gNB beam) may become misaligned, where such UE beam no longer points toward the gNB or gNB beam. For example, various conditions may cause or contribute to the misalignment of a UE beam with respect to the gNB, e.g., such as movement of the UE, or a change in location of the UE, or a change in the distance between the UE and gNB, a rotation of the UE relative to the gNB, and/or a change in the environment that may alter signal propagation, or other conditions or factors. The misalignment of a beam at the UE (UE DL beam or UE UL beam) may result in reduced performance, e.g., because signals that are transmitted and/or received by the UE will not have optimum or maximum beamforming gain, for example.

As a result, a UE may lose beam alignment, e.g., where a UE receive beam may no longer be aligned with a gNB transmit beam. It may be advantageous for the UE or gNB to be able to detect such cases of lost beam alignment at the UE. Once a UE beam misalignment has been detected (by the UE and/or the gNB), steps may be taken to re-establish UE beam alignment. Various example embodiments are described herein that may allow the UE and/or gNB to detect a UE beam misalignment (or lost beam alignment.

Figure 4:
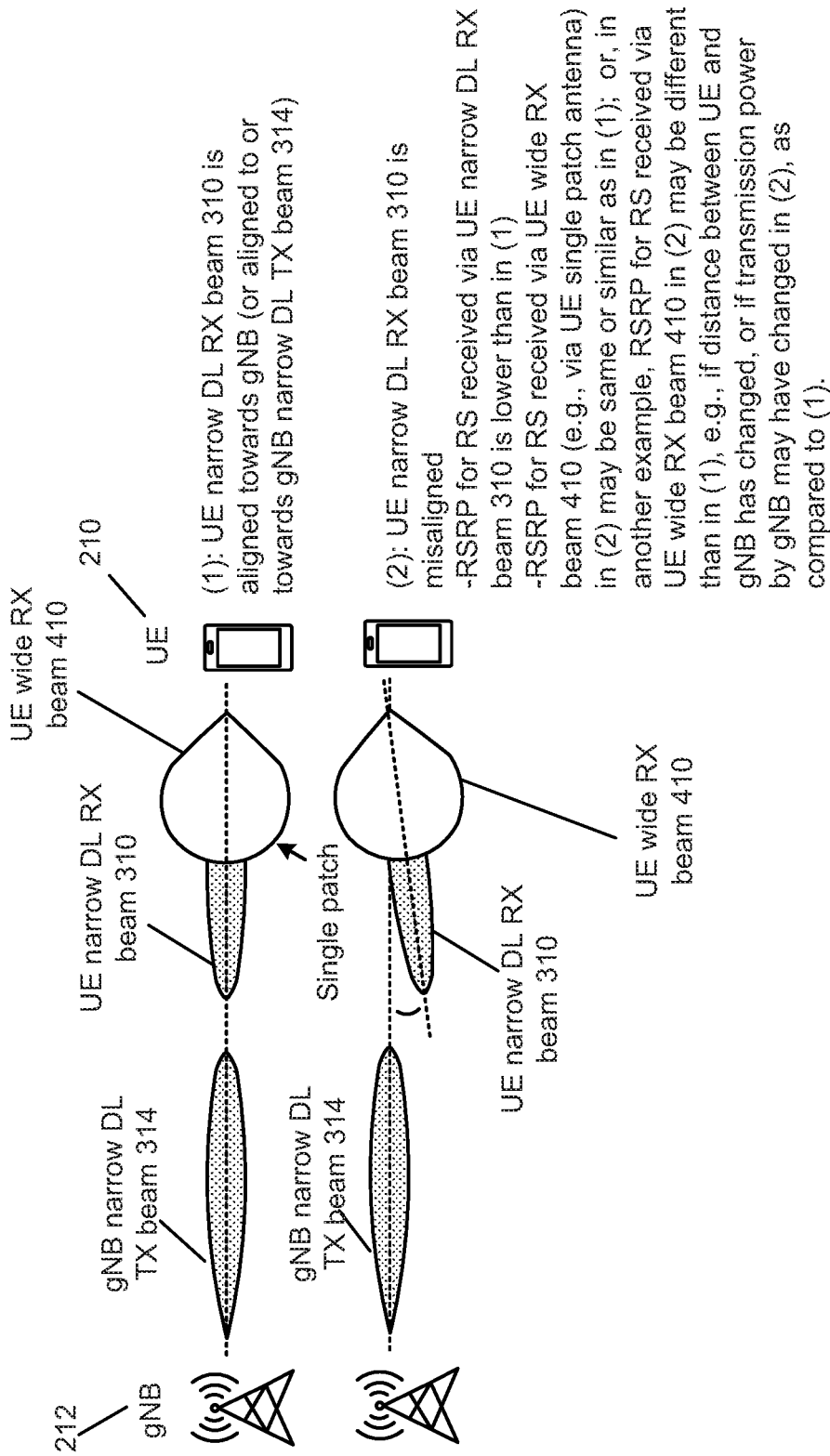
FIG. 4 is a diagram illustrating detection of beam misalignment according to an example embodiment.

FIG. 4 is a diagram illustrating a beam misalignment according to an example embodiment. Two cases are shown in FIG. 4, including aligned case (1) where there is beam alignment between the UE narrow receive beam 310 and the gNB narrow transmit beam 314, and a misaligned case (2) where the UE narrow receive beam 310 is (or has become) misaligned with the gNB narrow transmit beam 314.

With reference to aligned case (1) of FIG. 4, a UE 210 may be in communication with a gNB 212. According to an example embodiment, in aligned case (1) of FIG. 4, based on a beam alignment procedure (for example, see the beam alignment procedure for FIG. 2), the gNB 212 may select or determine a gNB narrow downlink transmit beam 314, based on a selected beam configuration, aligned or directed towards the UE 210. Likewise, UE 210 may select or determine a UE narrow DL receive beam 310, based on a selected narrow beam configuration, that is directed to or aligned with the gNB 212 or aligned with the gNB narrow downlink transmit beam 314. A beam configuration may include a set of one or more antenna weights, where each antenna weight may include an amplitude and phase that is applied to an antenna element or antenna patch, where the set of antenna weights cause the antenna to generate the specific beam width or beam shape. Thus, for example, the UE 210 may select a narrow beam configuration (e.g., including a set of antenna weights) to cause the UE antenna to generate the UE narrow DL receive beam 310 that is aligned with the gNB 212 or aligned with the gNB narrow DL transmit beam 314. Thus, as shown in aligned case (1), the UE narrow DL receive beam 310, based on a narrow beam configuration, is aligned with the gNB narrow transmit beam 314. Thus, for aligned case (1), a beamforming gain for DL signals may be, for example, optimum, or at least operate at near optimum (or relatively high) level, based on the alignment of the UE narrow receive beam 310 with the gNB narrow transmit beam 314.

Various example embodiments may involve or include a UE measurement of one or more delta calculations, including measurement of a first delta (or difference) calculation (e.g., which may be referred to as a beam alignment reference value) to be used as a reference value (e.g., representative of a UE beam that is aligned with the gNB), and then measurement of a second delta (or difference) calculation (which may be referred to as a beam alignment test value) to be analyzed with respect to the reference value, to determine or detect whether the UE beam is aligned or misaligned with respect to the gNB or a gNB beam. As noted, the beam alignment reference value may represent or indicate a reference value associated with an aligned UE beam, whereas the beam alignment test value may be a value that represents or indicates a (e.g., current) condition or direction or orientation of the UE beam (e.g., at a later point in time as compared to the beam alignment reference value) to be analyzed. For example, the current (or later) UE beam (e.g., UE DL receive beam) may be still aligned with the gNB or gNB beam, or may have become misaligned with the gNB or gNB beam. According to an example embodiment, the UE may make a beam alignment determination (e.g., determining whether a UE beam, such as a UE DL receive beam, is still aligned or is now misaligned with a gNB or gNB beam) based on the beam alignment reference value, the beam alignment test value, and a validation threshold. Further illustrative example embodiments and details are described below, including a description of the determination of the beam alignment reference value, the determination of the beam alignment test value. According to an example embodiment, the beam alignment determination at the UE, at least in some cases, may be independent of the transmit beam width used at the gNB, e.g., so long as (or assuming that) the transmit beam used at the gNB is static (same transmit beam) over the pair of power measurements of (or as part of) a delta calculation. According to an example embodiment, different gNB beams may be used between the measurements of the two delta calculations, but a same gNB transmit beam may or should be used by the UE for power measurements within each delta calculation. This is because, according to an example embodiment, it is the difference between the two delta values (e.g., absolute value of the difference between the beam alignment test value and the beam alignment reference value) that is used to make the beam alignment determination for the UE. Thus, the UE DL receive beam 310 may be aligned with any width gNB DL transmit beam.

The UE wide receive beam 410, e.g., based on a selected wide beam configuration selected by the UE 210, may also be aligned to the gNB 212 or with (or towards) the gNB narrow transmit beam 314. A wide beam may be wider (have a wider beam width) than a narrow beam. Thus, in an illustrative example, the UE may receive and perform measurements on a signal received via a UE narrow receive beam or a UE wide receive beam. The reference signal received and measured at the UE for may include, e.g., at least one of a SSB (synchronization signal block) block and/or a CSI-RS (channel state information-reference signal) signal. In order to improve measurement accuracy for the delta calculation (e.g., for the beam alignment reference value, or the beam alignment test value calculation) at the UE, the UE may receive the same reference signal from the gNB at (or via) unchanged gNB transmit beam (or via unchanged gNB transmit beam configuration) while the UE switches its beam configuration between the UE narrow receive beam and UE wide receive beam at the UE (to obtain the two power or RSRP measurements for the delta calculation). In this manner, the UE is preferably only changing the UE receive beam width between the two measurements and thus, the UE may obtain the best accuracy on the delta calculation (on the difference in power measurements for signal received via UE narrow receive beam and via UE wide receive beam). Also, for example, the UE 210 may use a multi-patch antenna array, where multiple patches (or multiple antenna elements) may be used (e.g., antenna weights applied to the multiple patches or antenna elements) to provide or generate a narrow beam. Also, fewer patches (e.g., one patch of the multiple patches) of the multi-patch antenna may be used to generate a UE wide beam (e.g., an antenna weight may be applied to fewer patches or antenna elements, for the UE to generate a wide beam, which is wider than the narrow beam).

However, as noted, one or more conditions, factors or situations may cause a loss of beam alignment, as may occur as shown in the illustrative example of misaligned case (2) of FIG. 4. Thus, for various reasons, the UE wide receive beam 410 (e.g., based on the same wide beam configuration used to generate UE wide receive beam 410 in case (1)) and/or the UE narrow receive beam 310 (e.g., based on the same narrow beam configuration used to generate UE narrow DL receive beam 310 in case (1)) in misaligned case (2) may be pointing in different directions, as compared to the UE wide receive beam 410 and UE narrow receive beam 310 for aligned case (1). Thus, the UE narrow receive beam 310 in misaligned case (2) may be a misaligned version of (using a same beam configuration as) the same UE narrow receive beam 310 used in aligned case (1). In other words, the UE narrow receive beam 310 in misaligned case (2) may be based on the same narrow beam configuration (e.g., set of antenna weights) as used to generate UE narrow receive beam 310 in the aligned case (1). But, as noted, due to various conditions (e.g., due to UE movement, or a change in UE position or distance to the gNB, or a change in UE orientation with respect to the gNB, or a change in the environment that may impact signal propagation, or other condition), the UE narrow DL receive beam 310 may have become misaligned with respect to the gNB or gNB transmit beam. Thus, the narrow beam configuration used by the UE to generate UE narrow DL receive beam 310 is (or may be) the same beam configured used by the UE for both the aligned case (1) and the misaligned case (2), but one or more conditions may have caused such UE narrow DL receive beam 310 to become misaligned for the (e.g., subsequent) misaligned case (2). Thus, as shown in misaligned case (2), the UE narrow receive beam 310 in case (2) is no longer aligned (or is misaligned, or at least may be misaligned) with the gNB narrow transmit beam 314. As a result, beamforming performance for downlink and/or uplink transmissions between the gNB 212 and the UE 210 will decrease or be reduced, as compared to performance for the beams shown in aligned case (1) of FIG. 4. Likewise, the same wide beam configuration (a set of one or more antenna weights applied to the antenna element(s) or antenna patch(es)) may be used by the UE 210 to generate the UE wide receive beam 410 for both aligned case (1) and misaligned case (2), but one or more conditions may have caused the UE wide receive beam 410 to become misaligned for case (2).

Thus, as shown in FIG. 4, in misaligned case (2), UE narrow DL receive beam 310 is misaligned (e.g., misaligned with the gNB 212 or a gNB beam). The RSRP for RS received via UE narrow downlink receive beam 310 is lower than in aligned case (1). RSRP for RS received via UE wide receive beam 410 (e.g., via UE single patch antenna) in misaligned case (2) may be same or similar as in case (1); or, in another example, RSRP for RS received via UE wide RX beam 410 in misaligned case (2) may be different than in aligned case (1), e.g., if distance between UE and gNB has changed, or if transmission power by gNB may have changed in case (2), as compared to case (1). However, these misalignments or changes in RSRP may impact both the UE narrow receive beam and the UE wide receive beam. However, a signal received via a misaligned wide beam may typically be impacted less (e.g., less decrease in RSRP for the wide beam) than a signal received via a misaligned narrow beam. As a result, it may be advantageous to also measure the RSRP of signal received at UE via UE wide receive beam (in addition to the RSRP of the UE narrow receive beam), and then use both of these RSRP measurements for the delta calculation (beam alignment reference value calculation or beam alignment test value calculation).

Thus, according to an example embodiment, a UE may first measure the received power (e.g., RSRP) of a reference signal received via a UE narrow receive beam 310. This first measured RSRP may be used as a reference measurement. For example, for aligned case (1), which may be shortly after a beam alignment procedure (such as a random access procedure), the UE may measure the RSRP of the received reference signal, so that the UE can trust or assume that the UE narrow receive beam for such measurement is aligned with the gNB narrow transmit beam. Later, a situation may arise where it may be desirable for the UE to determine whether the UE narrow receive beam is still aligned or not. Thus, for example, a second (or subsequent) RSRP measurement may be performed by the UE for a reference signal receive via the UE narrow receive beam (which may have changed in some way, causing misalignment). According to an example embodiment, the first RSRP measurement may be used as a reference measurement, while the second RSRP is a test measurement to determine whether the UE narrow receive beam is still aligned, or is now misaligned with the gNB narrow transmit beam. Thus, according to an example embodiment, the UE or BS/gNB may determine a difference between the first reference RSRP measurement (e.g., from case (1), which may be assumed to be an RSRP associated with an aligned UE narrow receive beam) and the subsequent or second RSRP measurement of the signal at the UE (e.g., which may be case (2), if the UE narrow beam has become misaligned with respect to the gNB or gNB transmit narrow beam). This difference (or absolute value of this difference) may be compared to a threshold value (e.g., which may be referred to as a validation threshold, since this threshold value may be used to validate or determine if the UE beam is aligned or misaligned with the gNB or gNB beam). If the difference of these two RSRP measurements is greater than a threshold, this may indicate that the UE narrow receive beam used to receive the reference signal for the second RSRP measurement is misaligned with respect to the gNB or with respect to the gNB narrow transmit beam.

However, there may be one or more conditions (e.g., which may not necessarily be related to beam misalignment) that may cause the measured RSRP values to be different. For example, as the UE may move, the distance between the UE and gNB may change or a position of the UE may change with respect to the gNB, and/or or a rotation of the UE with respect to the gNB, causing the RSRP of the received reference signal at the UE to change. Or, other conditions or changes may occur that may impact measured RSRP, such as a change in gNB transmit power, which may also impact the UE measured RSRP of received reference signals. Thus, for example, any changes which result in absolute downlink channel loss changes may be impossible to distinguish from a receive beam misalignment case if only relying on the absolute RSRP measured by narrow receive beams. In some situations, these changes may render the calculated difference between measured RSRP values as an unreliable indicator of whether the current UE narrow receive beam is aligned or misaligned. Thus, as noted above, a difference calculation may be used that takes or uses a difference between a RSRP of a signal received via UE narrow receive beam and a RSRP of a signal received via UE wide receive beam (where a narrow beam has a narrower beam width as compared to a wide beam).

Therefore, according to an example embodiment, a normalization (or adjustment) step may be used for each narrow beam RSRP measurement, to improve reliability of the RSRP difference measurement as an indicator of whether the UE narrow receive beam is aligned or misaligned, based on obtaining or determining the two delta calculations. For example, a UE measured RSRP of a reference signal received via a UE wide receive beam 410 may be the same, or be very similar, for aligned case (1) (UE beam alignment with gNB) and case (2) (UE beam misalignment with gNB). This is because an example wide beam (e.g., beam 410, FIG. 4) is much wider than a narrow beam (e.g., UE wide receive beam 410 is significantly wider than UE narrow receive beam 310). Thus, it is more likely that a UE wide receive beam will still substantially overlap with a gNB narrow transmit beam, even after such UE (wide and narrow) beams may change in direction or orientation. And, thus, at least in some cases, a change in beam direction or orientation (e.g., misalignment) of a wide beam 410 may not typically result in a significant change in measured RSRP. On the other hand, a change in beam direction or orientation for a narrow beam (e.g., beam misalignment) may result in a significant decrease in RSRP of a signal received via a misaligned beam (e.g., misaligned case (2)), as compared to the RSRP of a signal received via an aligned UE narrow receive beam (e.g., aligned cased (1)). Thus, for example, both the UE narrow receive beam and the UE wide receive beam may both become misaligned with respect to the gNB or gNB beam. However, the wide receive beam is much wider than the narrow receive beam, so the impact on RSRP (or beamforming gain) is much less in the case of a misaligned UE wide receive beam (e.g., the decrease in RSRP of a misaligned UE narrow receive beam may be much greater than for a misaligned wide receive beam). As an illustrative example, see aligned case (1) and misaligned case (2) of FIG. 4 for the UE narrow beam 310, where a significant reduction in RSRP of a signal received via narrow beam 310 would typically occur for the misaligned case (2) as compared to the aligned case (1). As shown in FIG. 4, for example, there is very little overlap of UE narrow receive beam 310 with gNB narrow transmit beam for misaligned case (2), where there is substantial overlap (alignment) in UE and gNB narrow beams for the aligned case (1).

Therefore, according to an example embodiment, a subtraction or difference operation (delta calculation) may first be performed for each UE narrow beam receive power (e.g., RSRP) measurement with respect to the UE wide beam receive power (e.g., RSRP), in order to make a more reliable determination as to whether a UE narrow beam is aligned or misaligned with a gNB or gNB narrow transmit beam. As described herein, these two delta calculations may, for example, be referred to as a beam alignment reference value (which may be a reference value, based on UE receive beam that is assumed to be aligned with the gNB), and a beam alignment test value (which may be a value, representing or based on a current or more recent UE beam orientation or direction to be analyzed to determine if the UE beam is still aligned, or has become misaligned, with respect to the gNB or gNB beam).

Thus, with reference to FIG. 4 as an illustrative example, according to an example embodiment, a method may include determining, by a UE (e.g., UE 210), a beam alignment reference value based on a first receive power of a signal received by the UE from a BS/gNB via a first UE receive beam (e.g., via UE narrow receive beam 310 of aligned case (1)), based on a first user equipment beam configuration (e.g., a selected narrow beam configuration), that is aligned with a transmit beam (e.g., gNB narrow DL transmit beam 314) of the gNB, and a second receive power of a signal received by the UE from the gNB/BS via a second UE receive beam (e.g., via UE wide receive beam 410 of aligned case (1)), based on a second user equipment beam configuration (e.g., a UE selected wide beam configuration), that is aligned with the transmit beam of the base station, wherein the first UE receive beam and the second UE receive beam have different beam widths (e.g., where first UE receive beam is a narrow beam and the second UE receive beam is a wide beam, or the first UE receive beam is a wide beam and the second UE receive beam is a narrow beam.

The method may also include determining, by the UE, a beam alignment test value based on a third receive power of a signal received by the UE from the BS/gNB via a third UE receive beam (e.g., via UE narrow receive beam 310 of case (2), where UE beam may be misaligned), based on the first user equipment beam configuration (e.g., same UE receive beam configuration used to measure the first receive power), and a fourth receive power of a signal received by the UE from the BS/gNB via a fourth UE receive beam (e.g., via UE wide receive beam 410 of aligned case (1)), based on the second user equipment beam configuration. Thus, for example, the same first UE beam configuration may be used by UE to generate the first UE receive beam (e.g., UE DL receive beam 310 for aligned case (1)) and the third UE receive beam (e.g., UE DL receive beam for misaligned case (2)) where such beam may have become misaligned).

The method may also include determining, by the UE, based on the beam alignment reference value and the beam alignment test value, that the third UE receive beam (e.g., UE DL receive beam for case (2), where such beam 310 may have become misaligned) used by the UE is not aligned with the transmit beam of the BS/gNB. The beams used may be narrow beams, wide beams, or beams of any beam width.

According to an example embodiment, the first UE receive beam may include a first UE narrow receive beam (e.g., UE narrow DL receive beam 310, of case (1)), based on the first UE beam configuration, that is aligned with the transmit beam of the BS/gNB; the third UE receive beam includes a second UE narrow receive beam (e.g., UE narrow DL receive beam 310, of case (2)), based on the first UE beam configuration, that is not aligned with the transmit beam of the base station. Thus, for example, the first and second UE narrow receive beams (e.g., beam 310 for case (1) and case (2)) may be based on or generated based on the same narrow beam configuration (e.g., based on the same set of UE antenna weights). Likewise, the second UE receive beam may include a first UE wide receive beam (e.g., UE wide receive beam 410, case (1)) that is wider than the first UE narrow receive beam, based on the second UE beam configuration, that is aligned with the transmit beam of the base station (e.g., UE wide receive beam 410, in case (1), is based on a UE wide beam configuration, and is aligned with gNB transmit beam). Also, the fourth UE receive beam may include a second UE wide receive beam (e.g., UE narrow DL receive beam 310, of case (2)) that is wider than the second UE narrow receive beam, based on the second UE beam configuration, that is not aligned with the transmit beam of the base station (e.g., UE wide receive beam 410, of case (2) is not aligned with the gNB transmit beam). The gNB/BS transmit beam may include the gNB narrow DL transmit beam 314, or a gNB wide DL transmit beam, for example.

The method may further include performing, by the UE, an action in response to the determining that the third UE receive beam (e.g., UE narrow receive beam 310 of case (2)) used by the UE is not aligned with the transmit beam of the gNB, such as one or more of the following, for example: sending, by the UE to the gNB/BS, a request for downlink reference signal transmission (e.g., to allow the UE to perform a new beam alignment procedure to obtain an updated UE narrow receive beam that is aligned with the gNB narrow transmit beam); sending, by the UE to the gNB, a message indicating that the third UE receive beam (e.g., the UE narrow receive beam 310 in case (2)) used by the UE is not aligned with the transmit beam of the gNB (e.g., gNB narrow transmit beam 314); or performing, by the user equipment, a beam realignment procedure to determine an updated UE receive beam that is aligned with a transmit beam of the gNB/BS.

Also, according to an example embodiment, the determining the beam alignment reference value may include determining a difference between the first receive power and the second receive power; and wherein the determining the beam alignment test value comprises determining a difference between the third receive power and the fourth receive power. Thus, according to an example embodiment, the second receive power and the fourth receive power measured by the UE of a signal received via the UE wide receive beam (e.g., beam 314, FIG. 4) may be used to normalize or adjust the UE receive power of signals received via a UE narrow receive beam (e.g., beam 310, for case (1) and case (2)), to adjust or normalize the first receive power, and third receive power, for the beam alignment reference value, and for the beam alignment test value.

The method may also include determining a validation threshold. Also, the determining that the third UE receive beam (e.g., UE narrow receive beam 310 of misaligned case (2)) used by the UE is not aligned with the transmit beam of the gNB may include: determining a difference value as a difference between the beam alignment reference value and the beam alignment test value; determining that the difference value is greater than the validation threshold. This may include determining that: (beam alignment ref. value-beam alignment test value)>validation threshold. If this is true, this may indicate that the second UE narrow receive beam (e.g., indicating that the narrow receive beam 310 of misaligned case (2)) is misaligned with the gNB narrow transmit beam 314). Otherwise (if this difference value is not greater than the validation threshold), then this may indicate that the UE narrow receive beam 310 is aligned (or is still aligned) with the gNB narrow transmit beam 314 (e.g., aligned case (1) is still true for the UE narrow receive beam 310).

According to an example embodiment, in this manner, a beam alignment result (e.g., indicating whether the UE narrow receive beam is aligned, or misaligned) may be determined by the UE 210. Various actions may be performed, by the UE and/or gNB, to re-establish UE beam alignment, if the beam alignment result indicates that the UE narrow receive beam is misaligned.

According to an example embodiment, for each beam alignment measurement, e.g., including for determining the beam alignment reference value and determining the beam alignment test value, the RSRP measurement of signals received via the UE narrow receive beam and UE wide receive beam should be performed after each other, and within a threshold period of time, e.g., such that channel coherency is maintained across both RSRP measurements.

Thus, for example, the determining, by the UE 210, of a beam alignment reference value may include: sending, by the UE to the gNB, a request for downlink reference signal transmission; receiving, by the UE from the gNB, at least one reference signal transmission via one or more BS beams; measuring the first receive power of a reference signal received by the UE from the BS via the first UE receive beam (e.g., via UE narrow receive beam 310 of aligned case (1), FIG. 4); and measuring the second receive power of the reference signal received by the UE from the gNB via the second UE receive beam (e.g., via. UE wide receive beam 410, FIG. 4); wherein the measuring are performed based on one of the following (e.g., to maintain channel coherency across these two RSRP measurements): the measuring of the second receive power is performed after, and within a threshold period of time of, the measuring of the first receive power; or the measuring of the first receive power is performed after, and within a threshold period of time of, the measuring of the second receive power. According to an example embodiment, the reference signals used for the first receive power measurement via the first UE receive beam and for the second receive power measurement via second UE receive beam are (or should be) transmitted using the same (or static) gNB transmit beam or same gNB transmit beam configuration. Likewise, the reference signals used for the third receive power measurement via the third UE receive beam and for the fourth receive power measurement via fourth UE receive beam are (or should be) transmitted using the same gNB transmit beam or same gNB transmit beam configuration (although the reference signals used for third and fourth receive power measurement may be different from the reference signals used for first and second receive power measurement).

A similar situation may be used to maintain channel coherency for the RSRP measurements (third and fourth receive power measurements) for the beam alignment test value. Thus, for example, the determining by the UE of a beam alignment test value may include: receiving, by the UE from the gNB, at least one reference signal transmission via one or more BS beams; measuring the third receive power of a reference signal received by the UE from the gNB/BS via the third UE receive beam (e.g., via the UE narrow receive beam 310, of misaligned case (2), FIG. 4); and measuring the fourth receive power of the reference signal received by the UE from the gNB via the fourth UE receive beam (e.g., via UE wide receive beam 410, FIG. 4); wherein the measuring are performed based on one of the following: the measuring of the fourth receive power is performed after, and within a threshold period of time of, the measuring of the third receive power; or the measuring of the third receive power is performed after, and within a threshold period of time of, the measuring of the fourth receive power.

The method may further include sending, by the UE to the gNB/BS, capability information indicating that the UE has a capability to measure and/or report beam alignment verification information.

Also, according to an example embodiment, the determining the beam alignment reference value and/or the determining the beam alignment test value may be performed in response to a request from the gNB for a beam alignment measurement.

Also, according to an example embodiment, the UE 210 may report (or send a message reporting) to the gNB 212 at least one of the following, for example: the beam alignment reference value for the UE; the beam alignment test value for the UE; or a beam alignment result for the user equipment that second UE narrow receive beam used by the user equipment is not aligned with the transmit narrow beam of the base station.

According to an example embodiment, a fast procedure for verification of DL beam alignment between a gNB and a UE is provided. The procedure may include the following operations, by way of illustrative example:

1) Upon cell search and attach completed the UE has aligned its RX beam to the TX beam of the gNB.

2) UE→gNB: During attached procedures the UE indicates its DL beam alignment verification measurement and reporting capability, e.g., via capability reporting to gNB.

3) gNB→UE: At any given time (e.g., which, for example, may be selected by serving gNB) a DL beam alignment reference measurement (e.g., to obtain a beam alignment reference value) is requested by gNB. For example, this may be triggered immediately after a beam re-alignment event (e.g., such as a random access procedure) at which point beam alignment between UE and serving gNB is assumed. One option is for the UE to make and store this measurement at that time and to report it to the gNB whenever it requests it. Alternatively, the UE can make the reference measurement and report it as part of the beam alignment/refinement procedure.

4) UE: The UE performs a reference signal (RS) RSRP measurement using its active DL beam (e.g., UE narrow receive beam 310) followed immediately (e.g., within a threshold period of time) by another RS RSRP measurement using its UE wide receive beam (e.g., using only one or a reduced number of antenna array elements (wide beam)). The UE calculates and stores the delta (or difference in) power between the two measurements as the reference result, which may be referred to as a beam alignment reference value. Thus, for example, the UE 210 may determine a difference between a first measured receive power of a signal received via a first UE receive beam (e.g., via UE narrow transmit beam 310, of case (1), FIG. 4) that is aligned with a transmit arrow beam of gNB (aligned with a gNB narrow transmit beam 314, of case (1), FIG. 4), and a second measured receive power of a signal received via a second UE receive beam (e.g., via UE wide receive beam 410, FIG. 4).

5) UE→gNB: The UE reports back to serving gNB the reference result (or the beam alignment reference value).

6) gNB→UE: At any given time (e.g., which may be selected by serving gNB), a DL beam alignment verification measurement is requested by gNB (e.g., for the UE to obtain a beam alignment test value, and/or to obtain a beam alignment result indicating whether the UE receive beam is aligned or misaligned with gNB transmit beam), which may include the gNB providing a validation threshold to the UE. This request may be periodic or for instance be triggered upon UE reporting poor DL quality. The validation threshold may be cell specific (e.g., one validation threshold used within a cell), or UE specific, e.g., dependent on the UE capability reporting.

7) UE: The UE performs an RS RSRP measurement using its active DL beam (e.g., a narrow beam, a wide beam, or any beam used by the UE) (e.g., such as UE narrow receive beam 310, case (2) of FIG. 4) followed immediately (e.g., within a threshold period of time) by an RS RSRP measurement using a second UE receive beam (e.g., wide receive beam 410, FIG. 4), such as using only one or a reduced number of antenna array elements or a reduced number of patches. The UE calculates the delta (or difference in) power between the two measurements and validates this against the reference result obtained in step 4 (reported in step 5 to gNB) using the validation threshold to obtain a beam alignment result (e.g., indicating that the UE narrow receive beam 310 is either aligned, or misaligned, with the gNB narrow transmit beam). The UE calculates and stores the delta (or difference in) power between the two measurements as a beam alignment test value.

8) UE→gNB: The UE may report to serving gNB the beam alignment result for the UE, e.g., indicating that the UE narrow receive beam is either aligned or misaligned with a gNB narrow transmit beam.

9) gNB: The beam alignment result reported to gNB in 8) (e.g., indicating beam misalignment, such as shown in the example of case (2) of FIG. 4) may be used by gNB to trigger activities such as, e.g., DL beam re-alignment and/or UE UL/DL beam correspondence mismatch detection. Or, the UE, based on the beam alignment result obtained or determined by the UE, the UE may request DL transmission of reference signals from the gNB and/or may perform a beam alignment procedure (e.g., see FIG. 2 as an example beam alignment procedure) for the UE to obtain an updated UE narrow receive beam that is aligned with gNB narrow transmit beam. Further examples will now be described.

Figure 5:
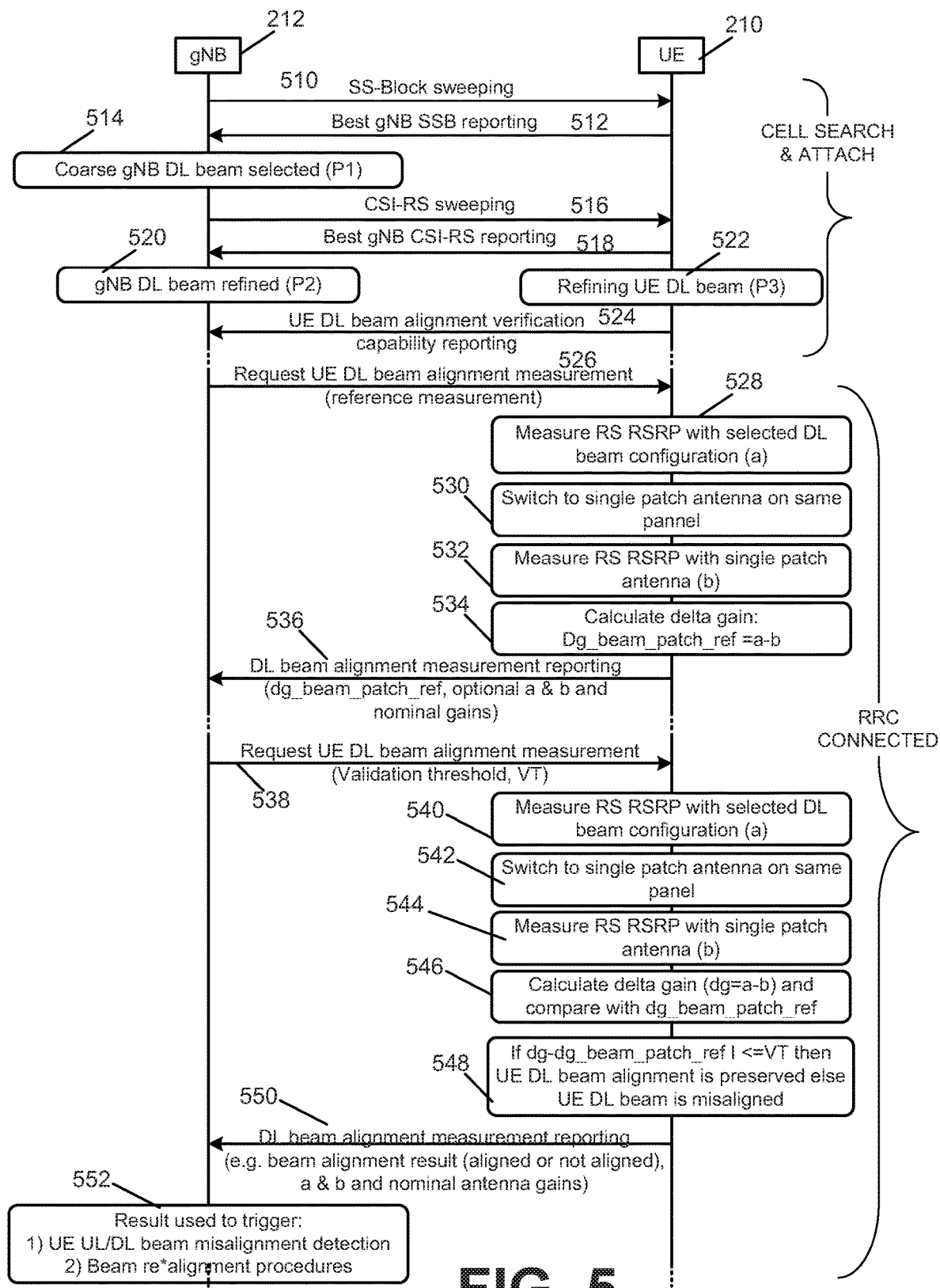
FIG. 5 is a diagram illustrating a beam alignment measurement procedure that is initiated by a base station or gNB according to an example embodiment.

FIG. 5 is a diagram illustrating a beam alignment measurement procedure that is initiated by a base station or gNB according to an example embodiment. Operation 510-522 may involve or relate to a beam alignment procedure, such as the beam alignment procedure described with reference to FIG. 2. Phase 1 (514) of the beam alignment procedure may correspond to operation 510-512. At 510, the gNB 212 performs beam sweeping, where the gNB may transmit reference signals (e.g., SSBs), while sweeping through a set of different SSB (e.g., wide or coarse) beams (e.g., SSB block transmission for different SSB beams). UE 210 may then determine the best (e.g., having a highest measured RSRP) gNB SSB or wide beam, and indicates to gNB 212 the best gNB wide/SSB beam. At 514, the gNB 212 selects this best wide or SSB beam for transmission. Operations 516 and 518 may be included within phase 2 (520) of the beam alignment procedure. At 516, the gNB 212 may perform CSI-RS (or narrow) beam sweeping. The UE 210 may measure CSI-RS received via the different gNB transmit narrow beams. At 518, the UE 210 reports back to gNB 212 the best (e.g., having the highest or strongest RSRP or SINR as measured by UE) gNB transmit CSI-RS. At 522, phase 3 of the beam alignment procedure is performed, e.g., where the gNB 212 transmits a reference signal (e.g., CSI-RS) via the best gNB narrow beam found in phase 2, and the UE sweeps through its different UE narrow receive beams to determine the best UE narrow receive beam (e.g., which is aligned with the selected or best gNB narrow transmit beam obtained in phase 2). The UE 210 determines or selects a UE narrow beam configuration (e.g., including a set of antenna weights) for the selected (or best) UE narrow receive beam.

At 524, the UE 210 may report capability information to the gNB, e.g., including capability information indicating that the UE 210 has a capability to measure and/or report beam alignment verification information (e.g., which may include information such as a beam alignment reference value, a beam alignment test value, and/or a beam alignment result indicating that the UE narrow receive beam is aligned or not aligned with the gNB narrow transmit beam).

At 526, the gNB 212 sends a request to the UE 210 for a UE beam alignment measurement, such as to obtain a beam alignment reference value for the UE. At any given time (selected by serving gNB) a DL beam alignment reference measurement is requested by gNB: This may be triggered immediately after a beam re-alignment event at which point UE beam alignment with gNB transmit beam is assumed. The measurement request includes an indication of this being a reference measurement (e.g., a request by gNB for a beam alignment reference value).

At 528, the UE 210, in response to the request at 526, may use a multi-patch (or multi-antenna element) antenna array to apply the selected UE narrow receive beam (e.g., associated with the selected or best UE narrow receive beam that is aligned with gNB narrow transmit beam). The UE measures the RSRP (a) of a signal received from the gNB via the UE narrow receive beam (determined in 522 by the UE) that is aligned with the gNB narrow transmit beam. Thus, for example, this may include measuring or determining a first receive power (or first RSRP) of a signal received via a first UE receive beam 310, of case (1), FIG. 4, where the narrow receive beam 310 of case (1) is aligned with the gNB narrow transmit beam 314 (case (1), FIG. 4).

At 530, the UE 210 may switch to a single patch (or apply coefficients to only one or fewer patches or antenna elements of its antenna array), to generate a UE wide receive beam. At 532, the UE 210 measures a RSRP (b) of a signal received via the single patch antenna, and thus, via a UE wide receive beam. Thus, for example, this may include the UE determining a second receive power of a signal received by the UE 210 from gNB 212 via a second UE receive beam (e.g., via a UE wide beam 410, case (1), FIG. 4).

At 534, the UE 210 determines a delta gain, as DG_beam_patch_ref=a−b. This, for example, may include the UE 210 determining a beam alignment reference value as a difference (or delta) between the first receive power (e.g., which may be measured with the UE narrow receive beam 310, case (1), FIG. 4), and the second receive power (e.g., which may be measured with the UE wide receive beam 410, case (1), FIG. 4), as examples, to obtain or determine the beam alignment reference value (shown in 534 of FIG. 5 as DG_beam_patch_ref=a−b).

Thus, for example, at 530-536, the UE may:
a. performs an RS RSRP measurement, a, using its active DL beam (narrow beam)
b. performs an RS RSRP measurement, b, using only one or a reduced number of antenna array elements (wide beam).
c. The measurements a and b should be performed immediately after each other (e.g., within a threshold period of time, or second measurement is performed within a threshold period of time after first measurement), to ensure that channel coherency is preserved between the narrow and wide beam measurements.
d. calculates and stores the delta power between the two measurements as the reference result, dg_beam_patch_ref=a−b. plus the nominal gain for beam configurations in measurement a and b.

At 536, the UE 210 may report to the gNB 212 various information that may include the DG_beam_patch_ref (the beam alignment reference value), a (first receive power), b (second receive power), and/or nominal gains of the antenna array of the UE used to measure the received reference signals. Thus, the UE reports back to serving gNB the reference result (or the beam alignment reference value), which may include dg_beam_patch_ref (or beam alignment reference value), a, b, and nominal gains used. Alternatively, and as a minimum, a simple report may be provided by the UE to gNB indicating that the reference measurement is complete.

At 538, at any given time (e.g., selected by serving gNB), a DL beam alignment verification measurement is requested by gNB. For instance, this may be triggered upon UE reporting poor DL quality. The request may include a validation threshold. Also, to facilitate measurement, the gNB: gNB transmits a static or fixed RS signal for UE to measure on.

At 540, the UE may measure RSRP (a) of reference signal received by UE via the current UE narrow receive beam. This may include, for example, the UE measuring a third receive power (RSRP) of a signal received via a third UE receive beam (e.g., via a UE narrow receive beam 310, case (2), FIG. 4), e.g., where the third UE receive beam may or may not be aligned with gNB narrow transmit beam. The UE is performing this process to determine or verify the UE beam alignment. Note, according to an example embodiment, the UE may apply the same beam configuration (e.g., applies a same set of antenna weights to the UE antenna) at operation 540 to generate the best UE receive beam (e.g., beam 310) that was used at operation 528. Thus, the same UE beam configuration may be used by UE to generate a UE receive beam (e.g., UE narrow receive beam 310) at both of measurement operations 528 and 540. While the generated best UE receive beam (e.g., 310) at operation 528 is assumed to be aligned with the gNB transmit beam, this same best UE receive beam (based on the same beam configuration) at operation 540 (e.g., where operation 540 may occur later in time than operation 528) may have become misaligned with the gNB transmit beam. Thus, the beam (e.g., UE receive beam 310) generated at operation 540 may be misaligned now, e.g., such beam 310 (case (2)) may be pointed or oriented in a direction that is not aligned with the gNB or gNB transmit beam. According to an example embodiment, the UE and/or gNB may use the procedure of FIG. 5 and/or FIG. 6 to determine or detect whether such UE receive beam (e.g., beam 310, measured at operation 540) is still aligned or has become misaligned with the gNB transmit beam.

At 542, the UE switches to a single patch or fewer patches/antenna elements to provide a UE wide receive beam (e.g., beam 410). At 544, the UE then may measure the RSRP or receive power (b) of a signal received via UE wide receive beam. For example, this may include the UE measuring a fourth receive power of a signal received via a UE wide receive beam (e.g., via UE wide receive beam 410, which may be case (2), FIG. 4). At 546, the UE may determine or calculate the delta gain (dg) (or beam alignment test value) as dg=a−b. At 548, if dg−dg_beam_patch_ref is <=VT, then UE narrow receive beam is assumed to be aligned with gNB narrow transmit beam (UE DL beam alignment is preserved or maintained), where VT refers to the validation threshold. Else, UE beam alignment does not (or no longer) exists for UE (e.g., UE narrow receive beam is not aligned to gNB narrow transmit beam).

Thus, for example, the UE may: performs an RS RSRP measurement, a, using its active DL beam (narrow beam);

performs an RS RSRP measurement, b, using only one or a reduced number of antenna array elements (wide beam). The measurements a and b should be performed immediately after each other to ensure that channel coherency is preserved between the narrow and wide beam measurements. The UE may perform the following: calculate and store the delta power between the two measurements as the measurement result, dg=a−b, plus the nominal gain for beam configurations in measurement a and b; and compare dg against dg_beam_patch_ref compensating for any gain delta between beam configurations used in measurements for dg and dg_beam_patch. The UE may determine a beam alignment results as one of the following: If |dg−dg_beam_patch_ref|<=threshold→UE DL beam alignment is preserved. If |dg−dg_beam_patch_ref|>threshold→DL beam is misaligned. For example, dg_beam_patch_ref may also be referred to as the beam alignment reference value, and dg may be referred to as the beam alignment test value.

Thus, for example, to determine the beam alignment test value, the UE 210 may determine a difference between a third measured receive power of a signal received via a third UE receive beam (e.g., via UE narrow transmit beam 310, of case (2), FIG. 4) and a fourth measured receive power of a signal received via a fourth UE receive beam (e.g., via UE wide receive beam 410, case (2), FIG. 4), to obtain the beam alignment test value. For example, the UE may then determine a difference value as a difference between the beam alignment reference value and the beam alignment test value, and then compare this difference value to the validation threshold. If this difference value is greater than the validation threshold, then this indicates or may indicate that the currently used (e.g., second UE narrow receive beam) UE narrow receive beam (e.g., narrow receive beam 310, case (2) of FIG. 4) is misaligned with the gNB or misaligned with the gNB narrow transmit beam (e.g., beam 314, FIG. 4). Otherwise, for example, if this difference value is less than or equal to the validation threshold, then this indicates or may indicate that the currently used UE narrow transmit beam (e.g., second UE narrow transmit beam 310, of FIG. 4) is (still) aligned with the gNB or aligned with the gNB narrow transmit beam (e.g., with beam 314).

At 550, the UE reports back information to the gNB, such as at least one of UE→gNB: The UE reports back to serving gNB the beam alignment result (e.g., aligned or not aligned), dg (or beam alignment test result), a (or third receive power), b (or fourth receive power) and/or nominal gains used at UE antenna array to perform measurements a and b, for example, to obtain dg (or the beam alignment test value). Or in another example embodiment, the report from the UE may include one or more of the following: the beam alignment reference value for the UE, the beam alignment test value for the UE, or the beam alignment result (e.g., indicating that the UE narrow receive beam is either aligned or misaligned with the gNB narrow transmit beam).

At 552, the beam alignment result reported to (e.g., indicating beam misalignment, such as shown in the example of case (2) of FIG. 4) may be used by gNB to trigger activities such as, e.g., DL beam re-alignment and/or UE UL/DL beam correspondence mismatch detection. Or, the UE, based on the beam alignment result obtained or determined by the UE, may request DL transmission of reference signals from the gNB and/or may perform a beam alignment procedure (e.g., see FIG. 2 as an example beam alignment procedure) for the UE to obtain an updated UE narrow receive beam that is aligned with gNB narrow transmit beam.

Figure 6:
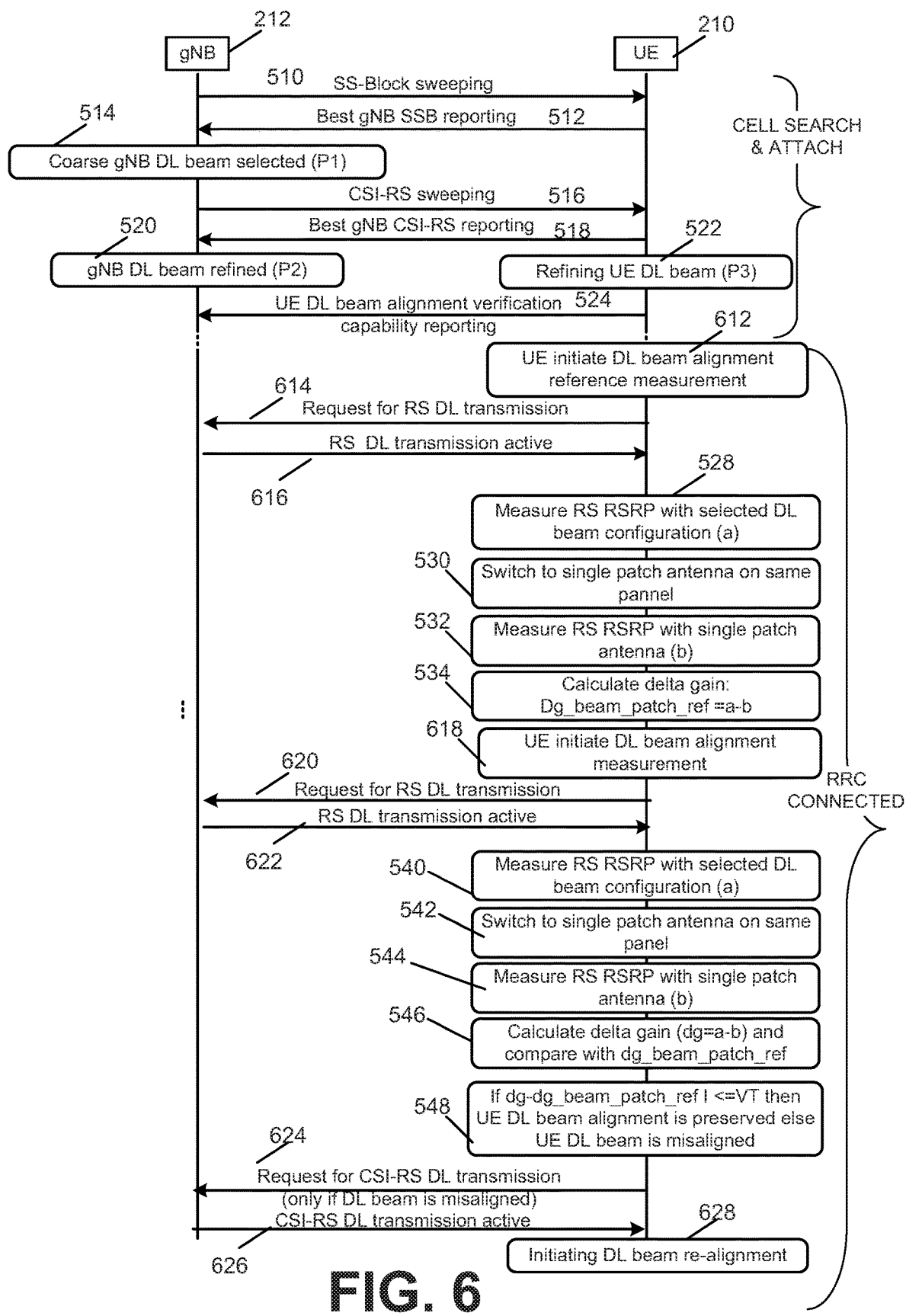
FIG. 6 is a diagram illustrating a beam alignment measurement procedure that is initiated by a user equipment (UE) according to an example embodiment.

FIG. 6 is a diagram illustrating a beam alignment measurement procedure that is initiated by a user equipment (UE) according to an example embodiment. The operations of FIG. 6 may be similar or the same as those shown in FIG. 5, except that operations 612, 614, 616, 618, 620, 622, 624, 626 and 628 have been added (or are new) to FIG. 6, while operations 526, 536, 538, 550 and 552 from FIG. 5 are omitted in FIG. 6. At 612, the UE initiates DL beam alignment reference measurement, e.g., to obtain a beam alignment reference value. Whereas in FIG. 5, at operation 526, the gNB requests the beam alignment measurement (reference measurement). At 614, the UE sends to gNB a request for DL reference signal transmission (e.g., to allow the UE to perform reference signal measurement). At 616, the gNB sends the DL reference signals. At 618, the UE initiates DL beam alignment measurement, e.g., to determine a beam alignment test value, for example, so as to allow the UE to test or verify the alignment (or misalignment) of the current UE narrow receive beam. Thus, operations 620 and 622, the UE requests and receives the DL reference signal transmission from the gNB. At 624, e.g., after the UE determinates at 548 that the current UE narrow receive beam is misaligned, sends a request to gNB for DL reference signal transmission. At 626, the gNB transmits the DL reference signals. At 628, the UE initiates or performs a downlink beam realignment procedure, e.g., see FIG. 2, to allow the UE to obtain an updated UE narrow receive beam that is aligned with the gNB narrow transmit beam.

According to an example embodiment, the CSI-RS (CSI reference signals) may be configured to support the functionality described above. For both cases (FIGS. 5 and 6), the UE may be configured with two downlink CSI-RS resource sets, where both sets have "repetition" set to "on". For example, setting the repetition to "on" indicates that the gNB will use the same TX beam to transmit all the resources within the resource set. For example, the first CSI-RS resource set may include two resources, one for the UE to measure the RSRP as received by the UE's narrow beam and the other to measure the RSRP as received by the UE's wide beam. The first resource set enables the "DL beam alignment reference measurement" as well as the measurement of the RSRP difference between the wide and narrow UE beams (for detecting misalignment). The second CSI-RS resource set may include X resources, where X is the number of UE beams (where the UE could inform X to the gNB as part of the UE capability reporting). The second CSI-RS resource set may enable or allow the full UE beam refinement (full UE sweep over X beams), for example. The first CSI-RS resource set could be scheduled as needed (aperiodic), or it could be scheduled to be periodic or semi-persistent at some interval consistent with the mobility level in the system, for example. The second resource set may be scheduled as needed on a UE or gNB-beam-specific basis. The UE may be configured to report the gain delta at some schedule (periodic, semi-persistent, a-periodic/as needed). Another example embodiment may be or may include where the UE decides when to request the full beam sweep based on measurements of the first CSI-RS resource set (i.e., there is no reporting the gain delta to the gNB). However, if the gain delta is reported, then the gNB can make the decisions on whether to do the full UE beam refinement (which might be preferred in practice).

Some Illustrative Example Features and/or Advantages: In some cases, the procedure(s) described herein may enable a fast detection of UE beam misalignment, such as a UE DL beam misalignment with respect to a gNB/BS. In some cases, the detection of beam misalignment may be performed without the need to perform a full DL beam sweep: For example, upon detection of one or more conditions, such as a detection of a DL signal quality problem indicated by available DL quality indicators, the proposed procedure enables a fast confirmation of root cause being a UE beam (e.g., UE DL receive beam) misalignment or not. For example, in case of a DL beam misalignment is detected a full DL beam re-alignment procedure may be initiated. This may reduce beam management overhead in the cell for cases where beam alignment is in fact preserved. DL beam alignment verification may be part of a full UL/DL beam correspondence verification and also in this context the proposed procedure may have a significant speed advantage over full DL beam sweeping which is overhead in case DL beam alignment is preserved.

Example 1. FIG. 7 is a flow chart illustrating operation of a user equipment according to an example embodiment. Operation 710 includes determining, by a user equipment, a beam alignment reference value based on a first receive power of a signal received by the user equipment from a base station via a first user equipment receive beam, based on a first user equipment beam configuration, that is aligned with a transmit beam of the base station, and a second receive power of a signal received by the user equipment from the base station via a second user equipment receive beam, based on a second user equipment beam configuration, that is aligned with the transmit beam of the base station, wherein the first user equipment receive beam and the second user equipment receive beam have different beam widths. Operation 720 includes determining, by the user equipment, a beam alignment test value based on a third receive power of a signal received by the user equipment from the base station via a third user equipment receive beam, based on the first user equipment beam configuration, and a fourth receive power of a signal received by the user equipment from the base station via a fourth user equipment receive beam, based on the second user equipment beam configuration. And, operation 730 includes determining, by the user equipment, based on the beam alignment reference value and the beam alignment test value, that the third user equipment receive beam used by the user equipment is not aligned with the transmit beam of the base station.

Example 2. The method of Example 1 wherein: the first user equipment receive beam comprises a first user equipment narrow receive beam, based on the first user equipment beam configuration, that is aligned with the transmit beam of the base station; the third user equipment receive beam comprises a second user equipment narrow receive beam, based on the first user equipment beam configuration, that is not aligned with the transmit beam of the base station; the second user equipment receive beam comprises a first user equipment wide receive beam that is wider than the first user equipment narrow receive beam, based on the second user equipment beam configuration, that is aligned with the transmit beam of the base station; and the fourth user equipment receive beam comprises a second user equipment wide receive beam that is wider than the second user equipment narrow receive beam, based on the second user equipment beam configuration, that is not aligned with the transmit beam of the base station.

Example 3. The method of Example 1, further comprising: performing, by the user equipment, an action in response to the determining that the third user equipment receive beam used by the user equipment is not aligned with the transmit beam of the base station.

Example 4. The method of Example 3, wherein the performing an action comprises: sending, by the user equipment to the base station, a request for downlink reference signal transmission.

Example 5. The method of Example 4, wherein the performing an action comprises: sending, by the user equipment to the base station, a message indicating that the third user equipment receive beam used by the user equipment is not aligned with the transmit beam of the base station.

Example 6. The method of Example 4, wherein the performing an action comprises: performing, by the user equipment, a beam realignment procedure to determine an updated user equipment receive beam that is aligned with the transmit beam of the base station.

Example 7. The method of any of Examples 1-6:
wherein the determining the beam alignment reference value comprises determining a difference between the first receive power and the second receive power; and wherein the determining the beam alignment test value comprises determining a difference between the third receive power and the fourth receive power.

Example 8. The method of Example 7, further comprising: determining a validation threshold; wherein the determining that the third user equipment receive beam used by the user equipment is not aligned with the transmit beam of the base station comprises: determining a difference value as a difference between the beam alignment reference value and the beam alignment test value; and, determining that the difference value is greater than the validation threshold.

Example 9. The method of any of Examples 1-8, further comprising: sending, by the user equipment to the base station, capability information indicating that the user equipment has a capability to measure and/or report beam alignment verification information.

Example 10. The method of any of Examples 1-9, wherein the determining the beam alignment reference value and/or the determining the beam alignment test value is performed in response to a request from the base station for a beam alignment measurement.

Example 11. The method of any of Examples 1-10, wherein the determining, by a user equipment, a beam alignment reference value comprises: receiving, by the user equipment from the base station, at least one reference signal via the transmit beam of the base station; measuring the first receive power of a reference signal received by the user equipment from a base station via the first user equipment receive beam; and measuring the second receive power of the reference signal received by the user equipment from the base station via the second user equipment receive beam; wherein the measuring are performed based on at least one of the following: the measuring of the second receive power is performed after, and within a threshold period of time of, the measuring of the first receive power; or the measuring of the first receive power is performed after, and within a threshold period of time of, the measuring of the second receive power.

Example 12. The method of any of Examples 1-11, wherein the determining, by a user equipment, a beam alignment test value comprises: receiving, by the user equipment from the base station, at least one reference signal via the transmit beam of the base station; measuring the third receive power of a reference signal received by the user equipment from a base station via the third user equipment receive beam; and measuring the fourth receive power of the reference signal received by the user equipment from the base station via the fourth user equipment receive beam; wherein the measuring are performed based on at least one of the following: the measuring of the fourth receive power is performed after, and within a threshold period of time of, the measuring of the third receive power; or the measuring of the third receive power is performed after, and within a threshold period of time of, the measuring of the fourth receive power.

Example 13. The method of any of Examples 1-12, further comprising:
sending, by the user equipment to the base station, a message including at least one of the following: the beam alignment reference value; the beam alignment test value; or a beam alignment result indicating that third user equipment receive beam used by the user equipment is not aligned with the transmit beam of the base station.

Example 14. The method of any of Examples 1-13: wherein the signal received by the user equipment from the base station via the first user equipment receive beam comprises at least one of a channel state information-reference signal or a synchronization signal block; wherein the signal received by the user equipment from the base station via the third user equipment receive beam comprises at least one of a channel state information-reference signal or a synchronization signal block; wherein the signal received by the user equipment from the base station via the second user equipment receive beam comprises at least one of a channel state information-reference signal or a synchronization signal block; and wherein the signal received by the user equipment from the base station via the fourth user equipment receive beam comprises at least one of a channel state information-reference signal or a synchronization signal block.

Example 15. An apparatus comprising means for performing the method of any of Examples 1-14.

Example 16. A non-transitory computer-readable storage medium comprising instructions stored thereon that, when executed by at least one processor, are configured to cause a computing system to perform the method of any of Examples 1-14.

Example 17. A computer program comprising instructions stored thereon for performing the method of any of Examples 1-14.

Example 18. A computer readable medium of wireless communication storing a program of instructions, execution of which by a processor configuring an apparatus to perform the method of any of Examples 1-14.

Example 19. An apparatus comprising: at least one processor; and at least one memory including computer program code; the at least one memory and the computer program code configured to, with the at least one processor, cause the apparatus at least to perform the method of any of Examples 1-14.

Figure 8:
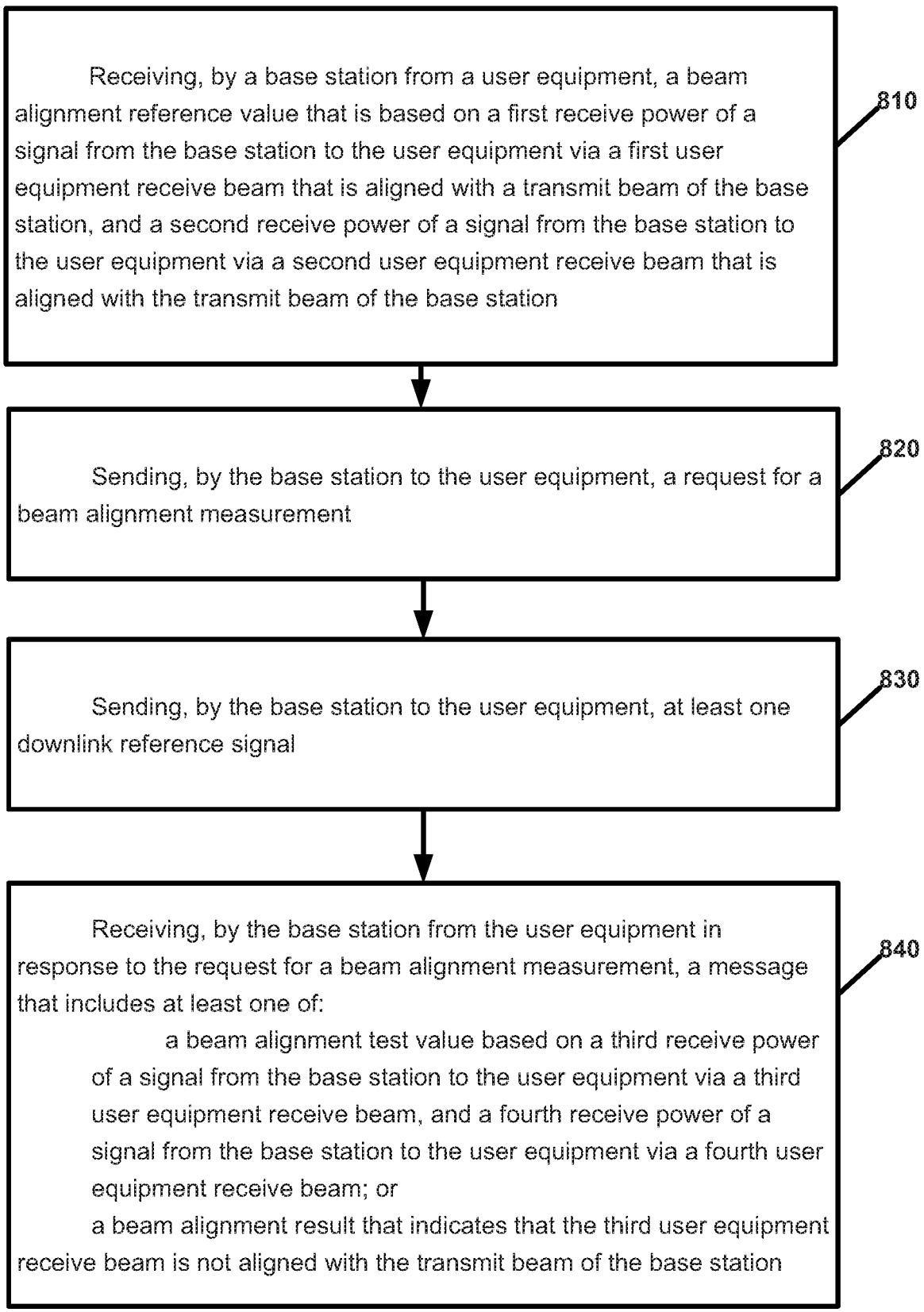
FIG. 8 is a flow chart illustrating operation of a base station or gNB according to an example embodiment.

Example 20. FIG. 8 is a flow chart illustrating operation of a base station or gNB according to an example embodiment. Operation 810 includes receiving, by a base station from a user equipment, a beam alignment reference value that is based on a first receive power of a signal from the base station to the user equipment via a first user equipment receive beam that is aligned with a transmit beam of the base station, and a second receive power of a signal from the base station to the user equipment via a second user equipment receive beam that is aligned with the transmit beam of the base station. Operation 820 includes sending, by the base station to the user equipment, a request for a beam alignment measurement. Operation 830 includes sending, by the base station to the user equipment, at least one downlink reference signal. Operation 840 includes receiving, by the base station from the user equipment in response to the request for a beam alignment measurement, a message that includes at least one of: a beam alignment test value based on a third receive power of a signal from the base station to the user equipment via a third user equipment receive beam, and a fourth receive power of a signal from the base station to the user equipment via a fourth user equipment receive beam; or a beam alignment result that indicates that the third user equipment receive beam is not aligned with the transmit beam of the base station.

Example 21. The method of Example 20 wherein: the first user equipment receive beam comprises a first user equipment narrow receive beam, based on a first user equipment beam configuration, that is aligned with the transmit beam of the base station; the third user equipment receive beam comprises a second user equipment narrow receive beam, based on the first user equipment beam configuration, that is not aligned with the transmit beam of the base station; the second user equipment receive beam comprises a first user equipment wide receive beam that is wider than the first user equipment narrow receive beam, based on a second user equipment beam configuration, that is aligned with the transmit beam of the base station; and the fourth user equipment receive beam comprises a second user equipment wide receive beam that is wider than the second user equipment narrow receive beam, based on the second user equipment beam configuration, that is not aligned with the transmit beam of the base station.

Example 22. The method of Example 20, further comprising: determining, by the base station, based on the beam alignment reference value and the beam alignment test value for the user equipment, that the third user equipment receive beam of the user equipment is not aligned with the transmit narrow beam of the base station.

Example 23. The method of any of Examples 20-22, further comprising: receiving, by the base station from the user equipment, capability information indicating that the user equipment has a capability to measure and/or report beam alignment verification information.

Example 24. The method of any of Examples 20-23, further comprising: sending, by the base station to the user equipment, a message indicating a validation threshold used for comparison of the beam alignment reference value and the beam alignment test value, to determine whether or not the third user equipment receive beam is aligned with the transmit beam of the base station.

Example 25. The method of any of Examples 20-24, further comprising the base station performing at least one of the following, in response to receiving the message: sending, by the base station to the user equipment, downlink reference signals; or sending, by the base station to the user equipment, a request to perform a beam realignment procedure to determine an updated user equipment receive beam that is aligned with a transmit beam of the base station.

Example 26. An apparatus comprising means for performing the method of any of Examples 20-25.

Example 27. A non-transitory computer-readable storage medium comprising instructions stored thereon that, when executed by at least one processor, are configured to cause a computing system to perform the method of any of Examples 20-25.

Example 28. A computer program comprising instructions stored thereon for performing the method of any of Examples 20-25.

Example 29. A computer readable medium of wireless communication storing a program of instructions, execution of which by a processor configuring an apparatus to perform the method of any of Examples 20-25.

Example 30. An apparatus comprising: at least one processor; and at least one memory including computer program code; the at least one memory and the computer program code configured to, with the at least one processor, cause the apparatus at least to perform the method of any of Examples 20-25.

Figure 9:
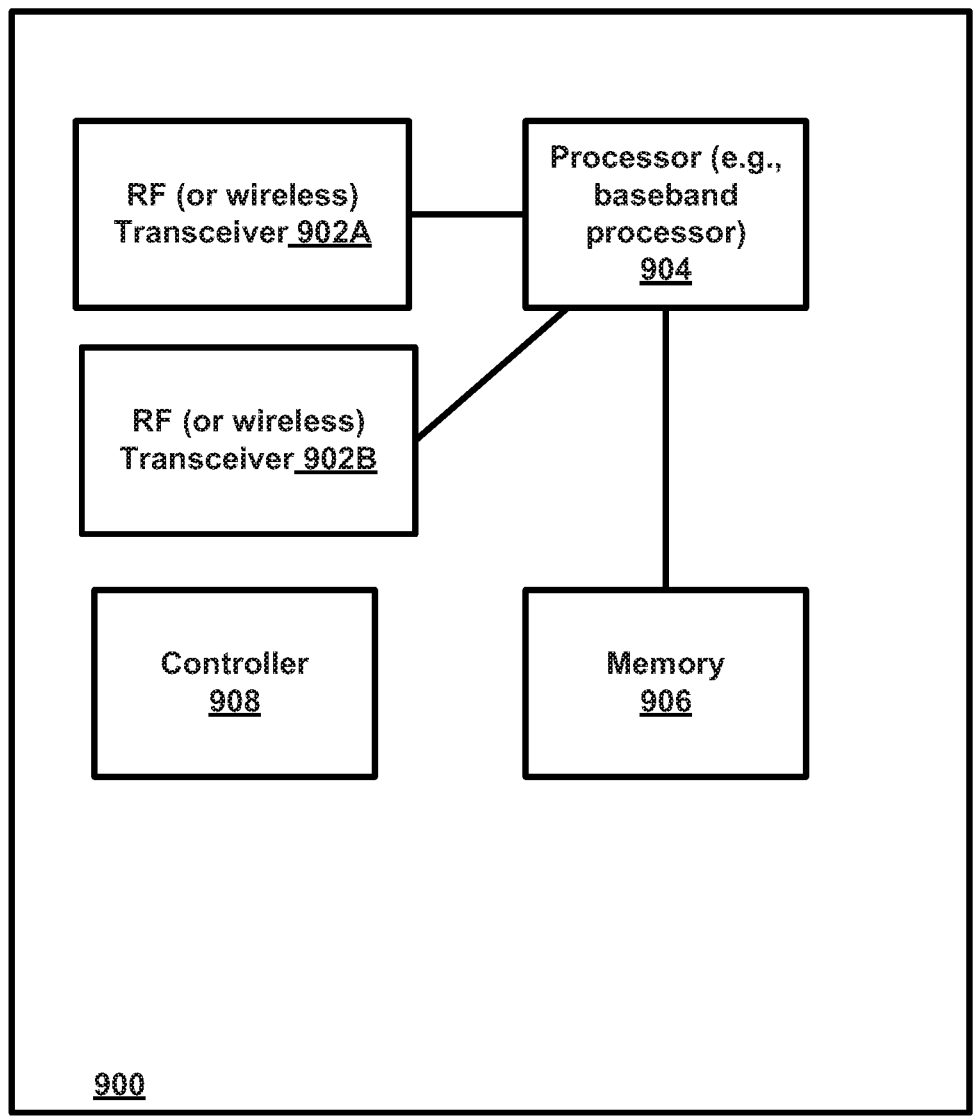
FIG. 9 is a block diagram of a wireless station (e.g., AP, BS, RAN node, UE or user device, or other network node) according to an example embodiment.

FIG. 9 is a block diagram of a wireless station (e.g., AP, BS or user device/UE, or other network node) 900 according to an example embodiment. The wireless station 900 may include, for example, one or more (e.g., two as shown in FIG. 9) RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example embodiment, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
at least one processor; and
at least one memory including computer program code;
the at least one memory and the computer program code configured to, with the at least one processor, cause the apparatus at least to:
determine a beam alignment reference value based on a first receive power of a signal received from a base station via a first user equipment receive beam, based on a first user equipment beam configuration, that is aligned with a transmit beam of the base station, and a second receive power of a signal received from the base station via a second user equipment receive beam, based on a second user equipment beam configuration, that is aligned with the transmit beam of the base station, wherein the first user equipment receive beam and the second user equipment receive beam have different beam widths;
determine a beam alignment test value based on a third receive power of a signal received from the base station via a third user equipment receive beam, based on the first user equipment beam configuration, and a fourth receive power of a signal received from the base station via a fourth user equipment receive beam, based on the second user equipment beam configuration; and
determine, based on the beam alignment reference value and the beam alignment test value, that the third user equipment receive beam used by the apparatus is not aligned with the transmit beam of the base station,
wherein the determining a beam alignment reference value comprises the at least one memory and the computer program code configured to, with the at least one processor, cause the apparatus at least to:
receive, from the base station, at least one reference signal via the transmit beam of the base station;
measure the first receive power of a reference signal received from the base station via the first user equipment receive beam; and
measure the second receive power of the reference signal received from the base station via the second user equipment receive beam;
wherein the measuring are performed based on:
the measuring of the second receive power is performed after, and within a threshold period of time of, the measuring of the first receive power; and
the measuring of the first receive power is performed after, and within a threshold period of time of, the measuring of the second receive power,
wherein the at least one memory and the computer program code configured to, with the at least one processor, cause the apparatus at least to:
send, to the base station, a message including the following: the beam alignment reference value;
the beam alignment test value; and
a beam alignment result indicating that third user equipment receive beam used by the apparatus is not aligned with the transmit beam of the base station,
wherein the determining the beam alignment reference value comprises the at least one memory and the computer program code configured to, with the at least one processor, cause the apparatus at least to: determine a difference between the first receive power and the second receive power; and wherein the determining the beam alignment test value comprises the at least one memory and the computer program code configured to, with the at least one processor, cause the apparatus at least to: determine a difference between the third receive power and the fourth receive power.

2. The apparatus of claim 1, wherein:
the first user equipment receive beam comprises a first user equipment narrow receive beam, based on the first user equipment beam configuration, that is aligned with the transmit beam of the base station;
the third user equipment receive beam comprises a second user equipment narrow receive beam, based on the first user equipment beam configuration, that is not aligned with the transmit beam of the base station;
the second user equipment receive beam comprises a first user equipment wide receive beam that is wider than the first user equipment narrow receive beam, based on the second user equipment beam configuration, that is aligned with the transmit beam of the base station; and
the fourth user equipment receive beam comprises a second user equipment wide receive beam that is wider than the second user equipment narrow receive beam, based on the second user equipment beam configuration, that is not aligned with the transmit beam of the base station.

3. The apparatus of claim 1, wherein the at least one memory and the computer program code configured to, with the at least one processor, cause the apparatus at least to:
perform an action in response to the determining that the third user equipment receive beam used by the apparatus is not aligned with the transmit beam of the base station.

4. The apparatus of claim 3, wherein the performing an action comprises the at least one memory and the computer program code configured to, with the at least one processor, cause the apparatus at least to:
send to the base station a request for downlink reference signal transmission.

5. The apparatus of claim 3, wherein the performing an action comprises the at least one memory and the computer program code configured to, with the at least one processor, cause the apparatus at least to:
send, to the base station, a message indicating that the third user equipment receive beam used by the apparatus is not aligned with the transmit beam of the base station.

6. The apparatus of claim 3, wherein the performing an action comprises the at least one memory and the computer program code configured to, with the at least one processor, cause the apparatus at least to:
perform a beam realignment procedure to determine an updated user equipment receive beam that is aligned with the transmit beam of the base station.

7. The apparatus of claim 1, wherein the at least one memory and the computer program code configured to, with the at least one processor, cause the apparatus at least to:
determine a validation threshold;
wherein the determining that the third user equipment receive beam used by the apparatus is not aligned with the transmit beam of the base station comprises:

determining a difference value as a difference between the beam alignment reference value and the beam alignment test value; and
determining that the difference value is greater than the validation threshold.

8. The apparatus of claim 1, wherein the at least one memory and the computer program code configured to, with the at least one processor, cause the apparatus at least to:
send, to the base station, capability information indicating that the apparatus has a capability to measure and/or report beam alignment verification information.

9. The apparatus of claim 1, wherein the determining the beam alignment reference value and/or the determining the beam alignment test value is performed in response to a request from the base station for a beam alignment measurement.

10. The apparatus of claim 1, wherein the determining a beam alignment test value comprises the at least one memory and the computer program code configured to, with the at least one processor, cause the apparatus at least to:
receive, from the base station, at least one reference signal via the transmit beam of the base station; measure the third receive power of a reference signal received from the base station via the third user equipment receive beam; and
measure the fourth receive power of the reference signal received from the base station via the fourth user equipment receive beam;
wherein the measuring are performed based on:
the measuring of the fourth receive power is performed after, and within threshold period of time of, the measuring of the third receive power; and
the measuring of the third receive power is performed after, and within a threshold period of time of, the measuring of the fourth receive power.

11. The apparatus of claim 1,
wherein the signal received from the base station via the first user equipment receive beam comprises a channel state information-reference signal and a synchronization signal block;
wherein the signal received from the base station via the third user equipment receive beam comprises a channel state information-reference signal and a synchronization signal block;
wherein the signal received from the base station via the second user equipment receive beam comprises a channel state information-reference signal and a synchronization signal block; and
wherein the signal received from the base station via the fourth user equipment receive beam comprises a channel state information-reference signal and a synchronization signal block.

12. A method, comprising:
determining, by a user equipment, a beam alignment reference value based on a first receive power of a signal received by the user equipment from a base station via a first user equipment receive beam, based on a first user equipment beam configuration, that is aligned with a transmit beam of the base station, and a second receive power of a signal received by the user equipment from the base station via a second user equipment receive beam, based on a second user equipment beam configuration, that is aligned with the transmit beam of the base station, wherein the first user equipment receive beam and the second user equipment receive beam have different beam widths;

determining, by the user equipment, a beam alignment test value based on a third receive power of a signal received by the user equipment from the base station via a third user equipment receive beam, based on the first user equipment beam configuration, and a fourth receive power of a signal received by the user equipment from the base station via a fourth user equipment receive beam, based on the second user equipment beam configuration; and determining, by the user equipment, based on the beam alignment reference value and the beam alignment test value, that the third user equipment receive beam used by the user equipment is not aligned with the transmit beam of the base station, wherein the determining a beam alignment reference value comprises:

receiving, from the base station, at least one reference signal via the transmit beam of the base station;

measuring the first receive power of a reference signal received from the base station via the first user equipment receive beam; and measuring the second receive power of the reference signal received from the base station via the second user equipment receive beam;

wherein the measuring are performed based on:

the measuring of the second receive power is performed after, and within a threshold period of time of, the measuring of the first receive power; and the measuring of the first receive power is performed after, and within a threshold period of time of, the measuring of the second receive power, wherein the method further comprises:

sending, to the base station, a message including the following:

the beam alignment reference value;

the beam alignment test value; and a beam alignment result indicating that third user equipment receive beam used by the apparatus is not aligned with the transmit beam of the base station, wherein the determining the beam alignment reference value comprises determining a difference between the first receive power and the second receive power; and wherein the determining the beam alignment test value comprises determining a difference between the third receive power and the fourth receive power.

13. A non-transitory computer readable medium comprising program instructions stored thereon for performing at least the following:

determining, by a user equipment, a beam alignment reference value based on a first receive power of a signal received by the user equipment from a base station via a first user equipment receive beam, based on a first user equipment beam configuration, that is aligned with a transmit beam of the base station, and a second receive power of a signal received by the user equipment from the base station via a second user equipment receive beam, based on a second user equipment beam configuration, that is aligned with the transmit beam of the base station, wherein the first user equipment receive beam and the second user equipment receive beam have different beam widths;

determining, by the user equipment, a beam alignment test value based on a third receive power of a signal received by the user equipment from the base station via a third user equipment receive beam, based on the first user equipment beam configuration, and a fourth receive power of a signal received by the user equipment from the base station via a fourth user equipment receive beam, based on the second user equipment beam configuration; and determining, by the user equipment, based on the beam alignment reference value and the beam alignment test value, that the third user equipment receive beam used by the user equipment is not aligned with the transmit beam of the base station, wherein the determining a beam alignment reference value comprises:

receiving, from the base station, at least one reference signal via the transmit beam of the base station;

measuring the first receive power of a reference signal received from the base station via the first user equipment receive beam; and measuring the second receive power of the reference signal received from the base station via the second user equipment receive beam;

wherein the measuring are performed based on:

the measuring of the second receive power is performed after, and within a threshold period of time of, the measuring of the first receive power; and the measuring of the first receive power is performed after, and within a threshold period of time of, the measuring of the second receive power, wherein the method further comprises:

sending, to the base station, a message including the following:

the beam alignment reference value;

the beam alignment test value; and a beam alignment result indicating that third user equipment receive beam used by the apparatus is not aligned with the transmit beam of the base station, wherein the determining the beam alignment reference value comprises determining a difference between the first receive power and the second receive power; and wherein the determining the beam alignment test value comprises determining a difference between the third receive power and the fourth receive power.

* * * * *